United States Patent [19]
Yanagi et al.

[11] Patent Number: 5,975,770
[45] Date of Patent: Nov. 2, 1999

[54] PLASTIC FERRULE FOR OPTICAL CONNECTOR AND METHOD FOR PRODUCTION THEREOF

[75] Inventors: Shuichi Yanagi; Hirotsugu Sato; Yoshito Shuto; Masayoshi Ohno; Yasuaki Tamura; Shunichi Tohno; Haruki Kozawaguchi, all of Tokyo, Japan

[73] Assignee: Nippon Telegraph and Telephone Corporation, Tokyo, Japan

[21] Appl. No.: 09/027,472

[22] Filed: Feb. 20, 1998

[30] Foreign Application Priority Data

Feb. 21, 1997 [JP] Japan ................................. 9-037322
Jan. 28, 1998 [JP] Japan ................................. 10-016229

[51] Int. Cl.⁶ ................................................ G02B 6/36
[52] U.S. Cl. ............................................................ 385/78
[58] Field of Search ............................... 385/52, 76, 77, 385/78, 85, 139, 59, 65, 8, 81, 83, 84; 65/412; 264/1.1, 1.25

[56] References Cited

U.S. PATENT DOCUMENTS

| 5,193,133 | 3/1993 | Schofield et al. ........................... 385/76 |
| 5,333,223 | 7/1994 | Schofield et al. ........................... 385/84 |
| 5,602,951 | 2/1997 | Shiota et al. ............................... 385/81 |
| 5,621,836 | 4/1997 | Schofield et al. ........................... 385/80 |

FOREIGN PATENT DOCUMENTS

| 0169073 | 1/1986 | European Pat. Off. . |
| 5-69203 | 4/1961 | Japan . |
| 57-81224 | 5/1982 | Japan . |
| 59-038707 | 3/1984 | Japan . |
| 59-109010 | 6/1984 | Japan . |
| 60-196706 | 10/1985 | Japan . |
| 61-7814 | 1/1986 | Japan . |
| 61-285282 | 12/1986 | Japan . |
| 01243005 | 9/1989 | Japan . |
| 1-243005 | 9/1989 | Japan . |
| 02293705 | 4/1990 | Japan . |
| 08015568 | 1/1996 | Japan . |
| 08297225 | 11/1996 | Japan . |
| 10-32148 | 1/1998 | Japan . |

OTHER PUBLICATIONS

"Design and Performance of the Bioconic Connector used in the FT3 Lighwave System", W.C. Young, et al., Proc. IWCS, (1981) pp. 411–418.

"Design and Performance of the new Single–Mode Fiber Connector with MP–Ferrule in Subscriber Network", K. Kashihara et al., Sumitomo Electric Industries, ltd.,; Proc. IWCS, (1987) pp. 379–381.

"Precise Molded Plastic Ferrules for Single Mode Optical Fibers"; DuPont, M.H. Johnson, et al., SPIE Proc., vol. 1992, pp. 47–53 (1993).

*Primary Examiner*—Akm E. Ullah
*Attorney, Agent, or Firm*—Venable; Robert J. Frank

[57] ABSTRACT

A plastic ferrule for an optical connector comprises a cylindrical portion having one insertion hole for fixing an optical fiber and directly related to connection, a holding portion for allowing the cylindrical portion to be stably held in an optical connector, and an guiding portion for allowing an optical fiber to be guided into the ferrule. The ferrule has a hollow, cylindrical hole centering around the insertion hole inside the cylindrical portion. Thus, the ferrule has excellent dimensional accuracy of the outer diameter, and achieves connection of single mode fibers excellent in connection reliability and economy.

21 Claims, 23 Drawing Sheets

PLASTIC FERRULE FOR OPTICAL CONNECTOR AND METHOD FOR PRODUCTION THEREOF

This application is based on application Ser. Nos. 37,322/1997 filed Feb. 21, 1997 and 16,229/1998 filed Jan. 28, 1998 in Japan, the content of which is incorporated hereinto by reference.

BACKGROUND OF THE INVENTION

1. Field of the Invention

This invention relates to a ferrule for an optical connector to be used in connecting single-mode fibers together. More specifically, the invention relates to an economical plastic ferrule for an optical connector, the ferrule being very small in the amount of eccentricity and in the dimensional change of the outer diameter of its cylinder, and the ferrule being capable of achieving reduction in the assembly cost and parts cost; and a method for the production of the ferrule.

2. Description of the Related Art

With the progress of optical communication technologies, it is becoming possible to introduce optical fibers into the household level and provide varieties of communication services. To realize such an optical communication network for use among general subscribers, there is need for a low cost, economical optical connector.

In connecting together optical fibers for use in optical communication, two ferrules 01A and 01B having optical fiber cords 03A and 03B inserted therein are arranged and aligned in a split alignment sleeve, as shown in FIG. 1. FIG. 2 is a sectional view of a ferrule used for this purpose, and shows a schematic structure of the ferrule. The ferrule has a coated optical fiber guide hole 04, and a fiber insertion hole 05 at the front end. The ferrule also includes a cylindrical portion 06 directly related to connection, a holding portion 07 for allowing the ferrule to be stably held in an optical connector, and an inserting portion 08 for allowing an optical fiber to be inserted into the ferrule.

The ferrule serves as a guide for holding an optical fiber and inserting it into an optical connector when the optical fiber is connected to another optical fiber. Very high dimensional accuracy as shown in Table 1 is required in the diameter of the optical fiber insertion hole, the amount of eccentricity of the optical fiber insertion hole, the outer diameter of the ferrule, and the roundness of the outer diameter.

TABLE 1

Dimensional requirements for ferrule

| Item | Dimensional tolerance |
| --- | --- |
| Outer diameter | 2.499 ± 0.0005 mm |
| Amount of eccentricity of optical fiber insertion hole | <0.7 μm |
| Size of optical fiber insertion hole | 125 + 1 μm − 0 μm |
| Roundness of outer diameter | <0.5 μm |
| Cylindricity of outer diameter | <0.5 μm |
| Surface roundness | <0.5 μm |

So far, a ferrule has been prepared by precision cutting and grinding a ceramic or metal material piece by piece. This has posed the problems of a low manufacturing efficiency and high parts costs.

To solve these problems, there have been attempts to produce a ferrule by plastic molding. For example, Yoshizawa et al. prepared a plastic ferrule by transfer molding of a phenolic resin (Research & Development Report, Vol. 32, No. 3, pp. 831–842, 1983). Back then, a multi-mode fiber with a large core outer diameter of about 50 μm was mainly used, and such a plastic ferrule was applicable in connecting multi-mode fibers. The plastic ferrule, however, cannot be applied to a single-mode fiber with a core outer diameter of 8 to 10 μm which is in current use for communication. Moreover, the ferrule, prepared by transfer molding, requires post-treatment such as flash trimming or heat-treatment after molding. From the viewpoint of economy during a manufacturing process, therefore, the plastic ferrule has not been fully satisfactory. An attempt was made to prepare a plastic ferrule by the use of a cost-effective injection molding technique. For this purpose, plastic materials such as PPS (polyphenylene sulfide) with relatively high thermal resistance and fluidity were considered.

For example, the following ferrules were investigated:

1. Biconical connector (ATT: W. C. Young et al., Proc. IWCS, 1981, p. 411–418)

Prepared by transfer molding of an epoxy resin. As in the study by Yoshizawa et al., the molding cycle was long, and required post-treatment such as deflashing. The manufacturing efficiency was too low to achieve cost reduction. For a single-mode fiber, the connecting properties were unsatisfactory.

2. A ferrule whose contour material was a hollow pipe and whose inside was fitted with a resin by transfer molding (Sumitomo Electric Industries, Ltd.: K. Kashihara et al., Proc. IWCS, 1987, p. 379–381)

Prepared by insert molding. Too laborious to prepare an economical ferrule at a low manufacturing cost.

Since the 1980's, the molding accuracy of injection molding has improved. Thus, a study was initiated using a more economical injection molding method (continuous production is easy and no post-treatment such as deflashing is required). Frequently studied molding materials were liquid crystal polymers (LCP) and polyphenylene sulfide (PPS).

3. A ferrule by injection molding using LCP (Du Pont: M. H. Johnson et al., SPIE Proc., vol. 1992, p.47–53, 1993)

Required the removal of a core pin from the ferrule after each molding shot, thus incapacitating continuous production. In addition, reliability in various environments was not entirely satisfactory.

4. A plastic ferrule configured to have a concave groove in the end face of the ferrule (NEC Corp.: K. Harada et al., Japanese Patent Application Laying-open No. 1-243005).

Has a concave groove in the ferrule end face, thus making the grinding of the ferrule end face difficult, and decreasing the strength of the fiber insertion hole portion.

The foregoing ferrules did not satisfy the dimensional accuracy, mechanical strength, or reliability for various parameters, capable of accommodating the connection of single-mode fibers. For example, the dimensional accuracy of a ferrule that is required for the connection of single-mode fibers has been shown to have to take the values listed in Table 1. Such a highly accurate ferrule has not been put into practical use.

The connecting properties of an optical connector can be evaluated by the connection loss and the return loss of the ferrule end face. The connection loss has to be not more than 0.5 dB, and the return loss must be 25 dB or more (Physical Contact (PC) grinding conditions) or 40 dB or more (Advanced Physical Contact (AdPC) grinding conditions).

Reliability tests have pointed out deterioration of the connecting properties that occurred in a high temperature or high humidity environment. The cause of this problem has been presumed to be that since a plastic ferrule has an optical fiber insertion hole length as shown in FIG. 2 of 1 to 2 mm (about 8 mm for a zirconia ferrule) according to the molding method, the adhesion between the optical fiber and the ferrule is insufficient under high temperature or high humidity conditions.

SUMMARY OF THE INVENTION

The present invention has been accomplished in the light of the above-described problems. The object of the invention is to provide a plastic ferrule for an optical connector to be used in connecting single-mode fibers together. More specifically, its object is to provide a plastic ferrule excellent in the dimensional accuracy of the ferrule outer diameter, mechanical strength, connecting properties, and economy.

In a first present invention, there is provided a plastic ferrule for an optical connector, which has a fiber guide hole at one end and a fiber insertion hole at the other end and whose outer diameter and eccentricity are controlled, comprising:

a first cylindrical body, and
a second cylindrical body shorter than the first cylindrical body, the second cylindrical body being formed inside the first cylindrical body with spacing from the first cylindrical body and coaxially with the first cylindrical body;
the first and second cylindrical bodies being continuous so as to close the spacing at their ends on the same side;
the interior of the first cylindrical body defining an guide hole for an optical fiber, and the interior of the second cylindrical body defining a insertion hole for the optical fiber; and
a flanged state being formed on the outer periphery of the first cylindrical body.

Here, the plastic ferrule for an optical connector may comprise a thermotropic liquid crystalline total aromatic polyester.

The cylindrical portion may have a taper at an angle of from 30 to 60 degrees, and the length of the insertion hole is 3 mm or more.

The holding portion or guiding portion may have a mark for showing the relative positional relationship of the ferrule in a mold for injection molding.

In a second present invention, there is provided a method for producing a plastic ferrule for an optical connector, which is bottomed and cylindrical, has one end opened to define an optical fiber guide hole and has the other end forming an opening for serving as an optical fiber insertion hole, comprising:

injection molding a resin composition in molds composed of a movable-side mold and a fixed-side mold, wherein
a core pin is fixed to the fixed-side mold, the core pin having a thin pin for forming an optical fiber insertion hole;
a pin catcher is fixed to the movable-side mold, the pin catcher having at the tip thereof a cylindrical depression having a core pin holding hole; and
the tip of the thin pin is held in the core pin holding hole in a noncontact state during clamping of the molds.

Here, the resin composition may be a resin composition containing at least a thermotropic liquid crystalline total aromatic polyester and an additive for reducing the orientation of the thermotropic liquid crystalline total aromatic polyester.

The mechanism for controlling the flow of resin may be provided in part of a resin flow channel through which the resin composition is injected into the molds.

The cylindrical center position of the cavity portion of the mold which forms the ferrule cylindrical portion and which does not move in accordance with the clamping of the molds may be movable relative to the central position of the thin pin forming the optical fiber insertion hole.

In a third present invention, there is provided a plastic ferrule for an optical connector, whose outer diameter changes and eccentricity have been controlled, the ferrule comprising a resin composition which contains at least a thermotropic liquid crystalline total aromatic polyester and an additive for reducing the orientation of the thermotropic liquid crystalline total aromatic polyester, and which, when injection molded, has anisotropy of the resin of 2 to 5 expressed as the ratio between the values of physical properties measured in the flowing direction of the resin and the direction perpendicular to the flowing direction.

Here, the thermotropic liquid crystalline total aromatic polyester may comprise a polymer of the formula (1) or (2):

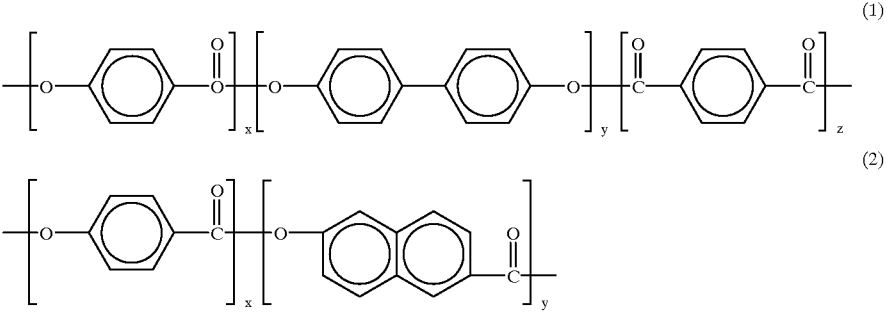

The holding portion or guiding portion may have a mark for showing the relative positional relationship of the ferrule in a mold for injection molding.

In a fourth present invention, there is provided a method for producing a plastic ferrule for an optical connector, which comprises a cylindrical portion having one insertion hole for fixing an optical fiber and directly related to connection, a holding portion for allowing the cylindrical portion to be stably held in an optical connector, and an guiding portion for allowing an optical fiber to be guided into the ferrule, comprising:

injection molding a resin composition in a mold;
the resin composition containing at least a thermotropic liquid crystalline total aromatic polyester and an additive for reducing the orientation of the thermotropic liquid crystalline total aromatic polyester; and the mold having a thin pin for forming an optical fiber insertion hole, the thin pin being provided inwardly of the tip of the cavity portion which forms the ferrule cylindrical portion and which does not move in accordance with mold clamping; the mold also having a pin receiving member having a pin receiving hole for receiving the tip of the thin pin during mold clamping, the pin receiving member being provided in the cavity portion moving in accordance with mold clamping; and the tip of the pin receiving member having an outer wall extending toward the cavity tip beyond the inside pin receiving hole to take a tubular form so as to surround from the surroundings the thin pin to be inserted in the pin receiving hole during mold clamping.

Here, the cylindrical center position of the cavity of the mold may be movable relative to the central position of the thin pin forming the optical fiber insertion hole.

The mechanism for controlling the flow of resin may be provided in part of a resin flow channel through which the resin composition is injected into the molds.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

We, the inventors, have closely investigated the conventional methods and their problems, and have accomplished the present invention. The object of the invention is attained by a ferrule of a particular shape prepared by the use of a mold having a structure as described below, or a ferrule prepared by using a specific resin composition to be described later on. The following are the details.

(1) Selection of a Ferrule Structure

Figure 3:
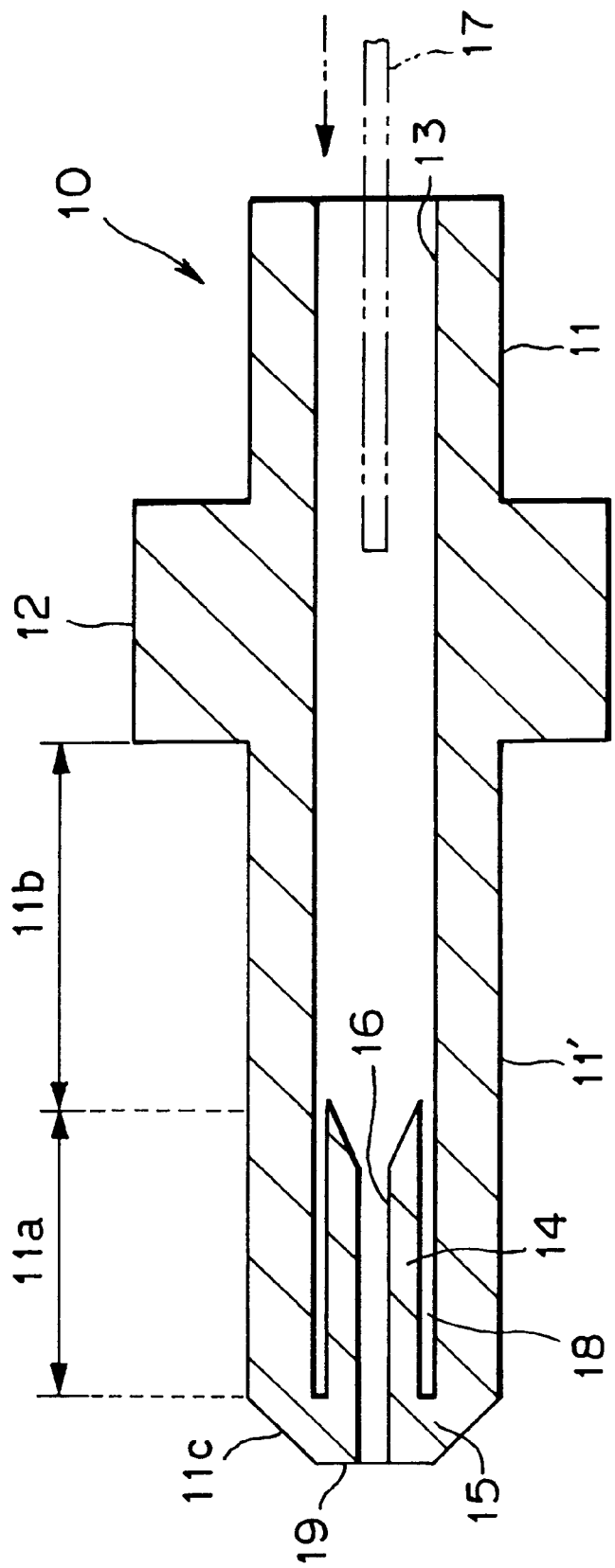
FIG. 3 is a sectional view of a plastic ferrule according to the present invention.

The ferrule of the present invention can achieve a reduction in the amount of eccentricity while retaining a sufficient adhesion, and can fulfill the dimensional conditions for the ferrule shown in Table 1. FIG. 3 shows the ferrule of the invention. A ferrule 10 of the invention is in a double cylinder shape. An end of a first cylinder 11 makes an optical fiber insertion hole 16. On the outer periphery of the cylinder 11, a collar-shaped holding portion 12 is disposed for stably holding the cylindrical portion in an optical connector. The cylindrical portion 11 ranging from the holding portion 12 to the tip is directly related to the connection of optical fibers. In the front end portion opposed to the optical fiber insertion hole 16, a second cylinder 14 projects toward the interior of the cylinder 11 with clearance provided between the cylinder 14 and the cylinder 11. The ends of the cylinders 11 and 14 are continuous except the inner diameter area of the cylinder 14. The cylinder 14 defines a insertion hole for an optical fiber. That is, an end of a first optical fiber passed through the insertion hole of a first ferrule, and an end of a second optical fiber passed through the insertion hole of a second ferrule contact each other in a connector. The contour of the end on the insertion hole side of the cylinder 11 should better be tapered.

The features of this ferrule are described below.

The optical fiber insertion hole is so long compared with conventional examples that an optical fiber can be fixed firmly. If a ferrule is a single cylinder with a thick wall only on the insertion hole side and with a long insertion hole, such a ferrule poses the following problem: When the ferrule after injection molding is cooled, the thick wall portion is slow in cooling, and its sink mark is large compared with the thin wall portion. As a result, the outer diameter of the cylinder differs from that of other parts. In the present invention, on the other hand, the wall thickness of the cylinder 11 is uniform in the longitudinal direction, thus causing no such problem. Furthermore, the front end portion of the ferrule is quick in cooling and tends to widen out like a trumpet.

However, its cooling rate can be made close to that of other parts by providing the second cylinder. In addition, that problem can be nearly solved by tapering the front end.

Such a ferrule can be produced by use of a mold to be described blow.

(2) Selection of a Mold Structure

Figure 4:
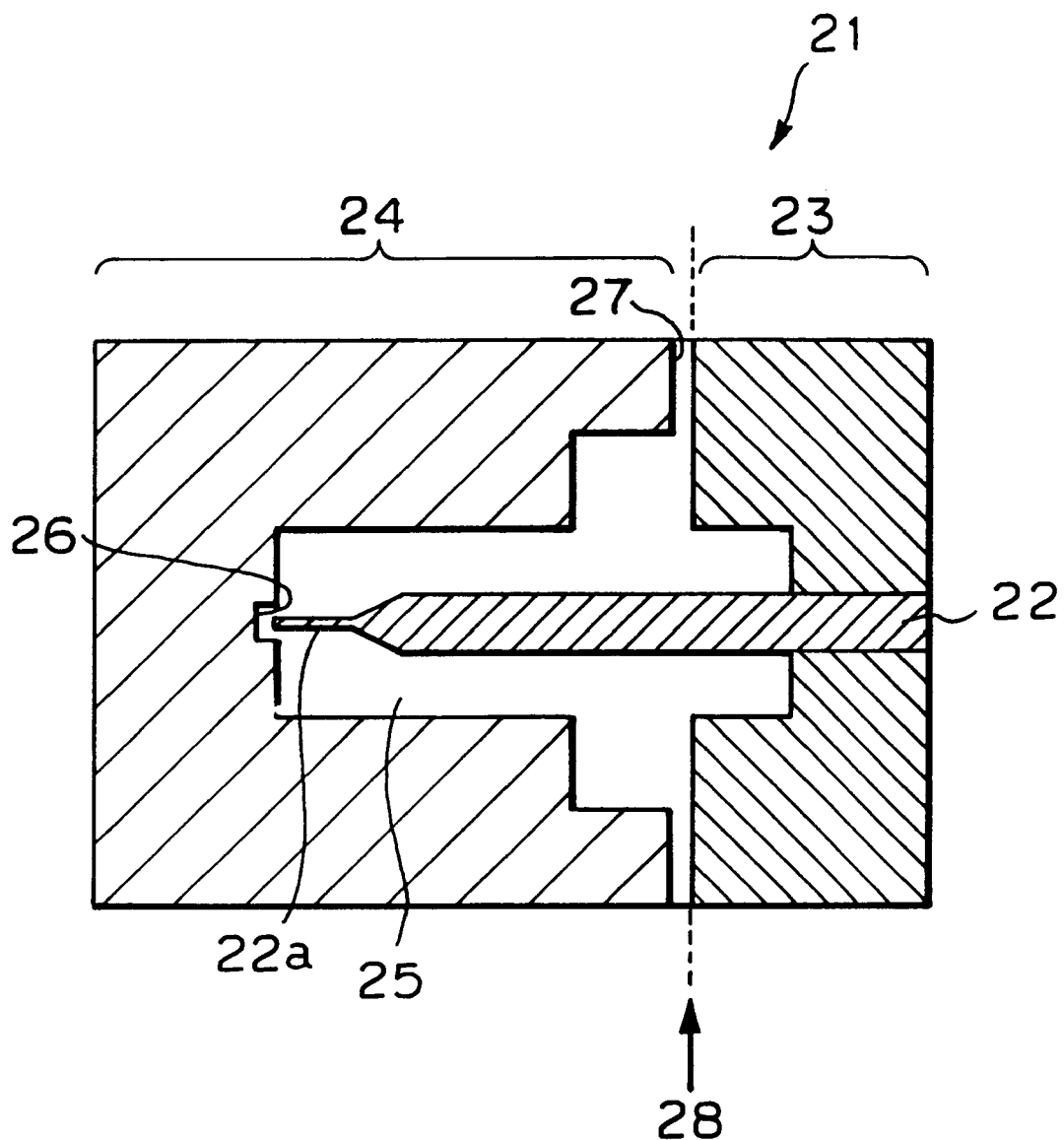
FIG. 4 is a sectional view of a conventional mold for molding a ferrule.
Figure 5:
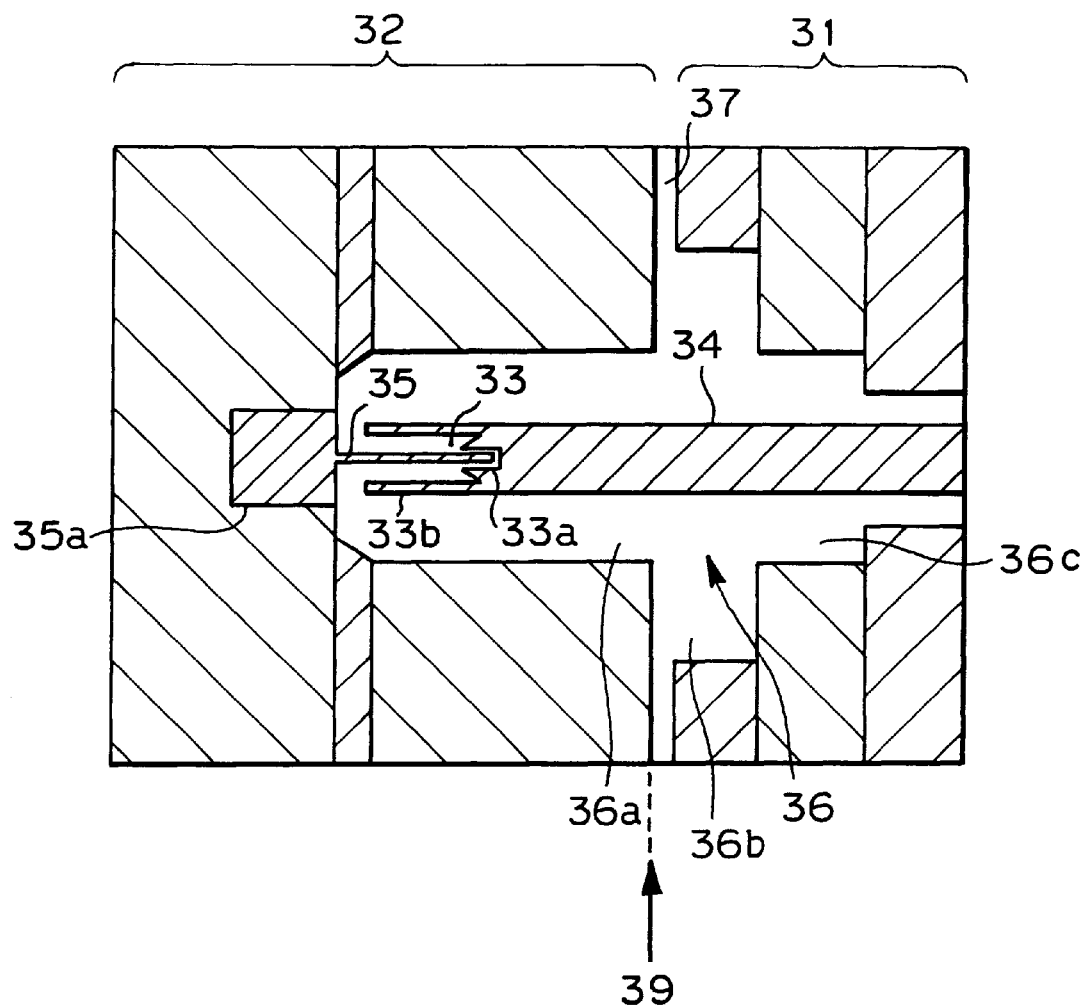
FIG. 5 is a sectional view of a mold for ferrule molding which is used in the present invention.

To reduce the amount of eccentricity in a plastic (resin) ferrule is the biggest technical challenge. The amount of eccentricity depends greatly on the structure of a mold to be employed. FIG. 4 shows a conventional typical mold structure, while FIG. 5 shows an example of the structure of a mold used in the present invention. A ferrule prepared by using the mold shown in FIG. 5 can attain the object of the invention.

A mold 21 of FIG. 4 has a structure in which a core pin 22 for forming a coated optical fiber guide hole and an optical fiber insertion hole is provided in a movable-side mold 23, and is held by clamping in a pin receiving portion 26 within a cavity of a fixed-side mold 24. In FIG. 4, the numeral 27 denotes a resin inflow portion, and the numeral 28 denotes a parting line.

As shown in FIG. 4, the core pin 22 is set accurately in the center of the cavity, but moves by about 10 to 20 cm when clamped. Between a thin tip 22a of the core pin 22 and the pin receiving portion 26, a clearance measuring at least several $\mu$m is necessary. Thus, when the resin becomes fluid during molding, the core pin vibrates, and eccentricity of several $\mu$m occurs in the resulting ferrule.

To solve this problem, the mold structure of FIG. 5 is intended to fix a core pin 35a to a fixed-side mold 32.

With this structure, the fixed core pin 35a does not move during molding, and a thin pin 35 fixed to the fixed core pin 35a does not move. By making the eccentricity of the mold small, therefore, a molded ferrule with minimal eccentricity can be obtained. The mold structure of FIG. 5 is also configured to have a hollow cylindrical space in which the tip of the thin pin 35 is held in a core pin holding hole so as to give a moderate clearance between it and a pin catcher 34, and the thin pin 35 is the axial center of the space. Thus, a resin which has flowed in through the resin inflow portion (gate) 37 and has moved toward the cylinder tip passes through a first cavity. Then, the resin fills a cylindrical space 33 around the thin pin, but does not fill the core pin holding hole 33a in front of the thin pin. Therefore, a ferrule having a through-hole continuously ranging from the coated fiber guide hole to the fiber insertion hole is molded. The size of the clearance in front of the thin pin tip is determined by the type of the resin filled. If the clearance is too wide, the resin reaches as far as the area in front of the thin pin, causing a flash, which makes it impossible to form the coated fiber guide hole and the fiber insertion hole continuous with each other. The problem of the flash can be solved by controlling the size of the clearance, or by selecting the type of the molding material.

The suitable length of the fiber insertion hole is 3 mm or more, and the preferred structure of the mold is such that the front end portion of the ferrule is tapered. The suitable angle of the taper is from 30 to 60 degrees.

Figure 1:
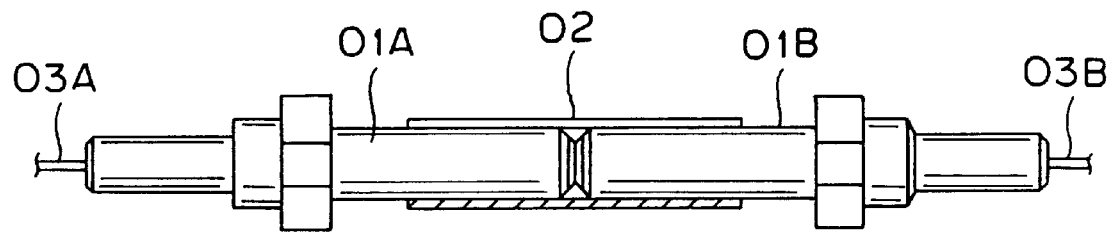
FIG. 1 is a view showing the state of connection of conventional ferrules in a split alignment sleeve.
Figure 2:
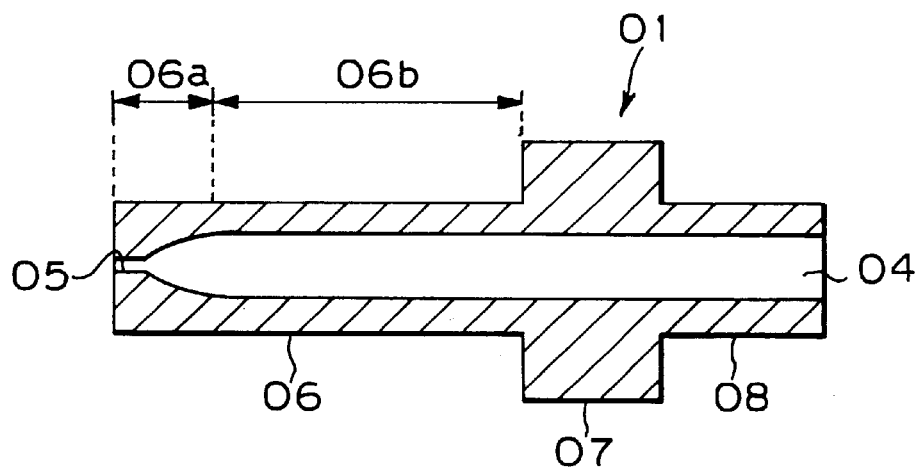
FIG. 2 is a sectional view of a conventional plastic ferrule.

The use of such a mold has enabled the production of a plastic ferrule with an amount of eccentricity of 1 $\mu$m or less. With the conventional ferrule illustrated in FIG. 2, on the other hand, the resin wall thickness of the cylinder is different between the tip 06a of the cylindrical portion and the middle 06b of the cylindrical portion, thus causing a difference in the resin packing density and a difference in the cooling time. This becomes the cause of generating a sink mark in the outer wall of the cylindrical portion, thus making the cylinder outer diameter in the longitudinal direction nonuniform. This worsens the connection loss of an optical fiber, and affects the mating characteristics. With the conventional ferrule, therefore, it has been difficult to make the length of the fiber insertion hole 3 mm or more.

The mold of FIG. 5 is provided with a cylindrical outer wall 33b of a hollow cylindrical shape having the fiber insertion hole as its central axis. Thus, the same resin wall thickness can be imparted to those portions of the cylinder corresponding to the tip 06a of the cylindrical portion (corresponding to 11a of FIG. 3) and the middle 06b of the cylindrical portion (corresponding to 11b of FIG. 3) of the ferrule prepared by the conventional mold of FIG. 4. FIG. 3 shows the cross sectional structure of the plastic ferrule molded by a mold having the structure of FIG. 5. Since the tip 11a of the cylindrical portion and the middle 11b of the cylindrical portion have the same resin wall thickness, there can be obtained a cylinder contour having uniform outer diameter in the longitudinal direction.

As noted above, the use of the mold having the structure of FIG. 5 can give a molded product with minimal eccentricity and few dimensional changes in cylinder outer diameter.

(3) Selection of Molding Material

To select a molding material in a molding technique is one of important issues. When a thermosetting resin such as phenolic resin or epoxy resin is used, for example, the aforementioned occurrence of a flash is so marked that post-treatment is required. Thus, an economical ferrule cannot be obtained.

A thermoplastic resin, by contrast, has a high viscosity at the time of melting, and so the resin does not enter the clearance between the core thin pin and the pin catcher. Such a resin may be advantageous in terms of the problem of flash.

Plastic materials that can replace metals or ceramic materials are usually called engineering plastics, and various types have been developed until recently.

Among them are materials falling within a category called "general-purpose engineering plastics". Their examples are polybutylene terephthalate (PBT), polycarbonates (PC), polyamides (PA), polyphenylene oxides (PPO) and polyacetals (POM).

Materials which belong to a category called "high performance engineering plastics" include, for example, polyarylates (PAR), polysulfones (PSF), polyphenylene sulfides (PPS), liquid crystal polymers (LCP), polyether sulfones (PES), polyether imides (PEI), polyamideimides (PAI), polyether ether ketones (PEEK) and polyimides (PI).

In preparing a ferrule with the use of the mold of FIG. 5, the above-mentioned engineering plastics or high-performance engineering plastics are used as resin compositions.

Concretely, it is preferred that a resin composition be formed from a resin selected from polyether imide resins, polyether sulfone resins and polysulfone resins and an inorganic substance selected from single-crystal inorganic acicular crystals. By using such a resin composition, excellent effects can be obtained. The above-described resins and inorganic substances may be used along or in combination.

Polyether imides, polyether sulfone, and polysulfones are amorphous high-performance engineering plastics, which are low in the orientation of the resin per se, and high in mechanical strength and heat resistance. Thus, these resins can be used in the present invention preferably.

Examples of polyether imides are polymers of structures expressed by the following formulae (Ia) to (Id) where n is an integer of 10 to 1,000. Of these polyether imides, the polymer of the formula (Ia) is commercially available (trade name "Urutem", GE Plastics). The polymers of the structures represented by the formulas (Ib) to (Id) are either publicly known, or can be prepared by publicly known methods. However, the polyether imides that can be used in the present invention are not restricted to them.

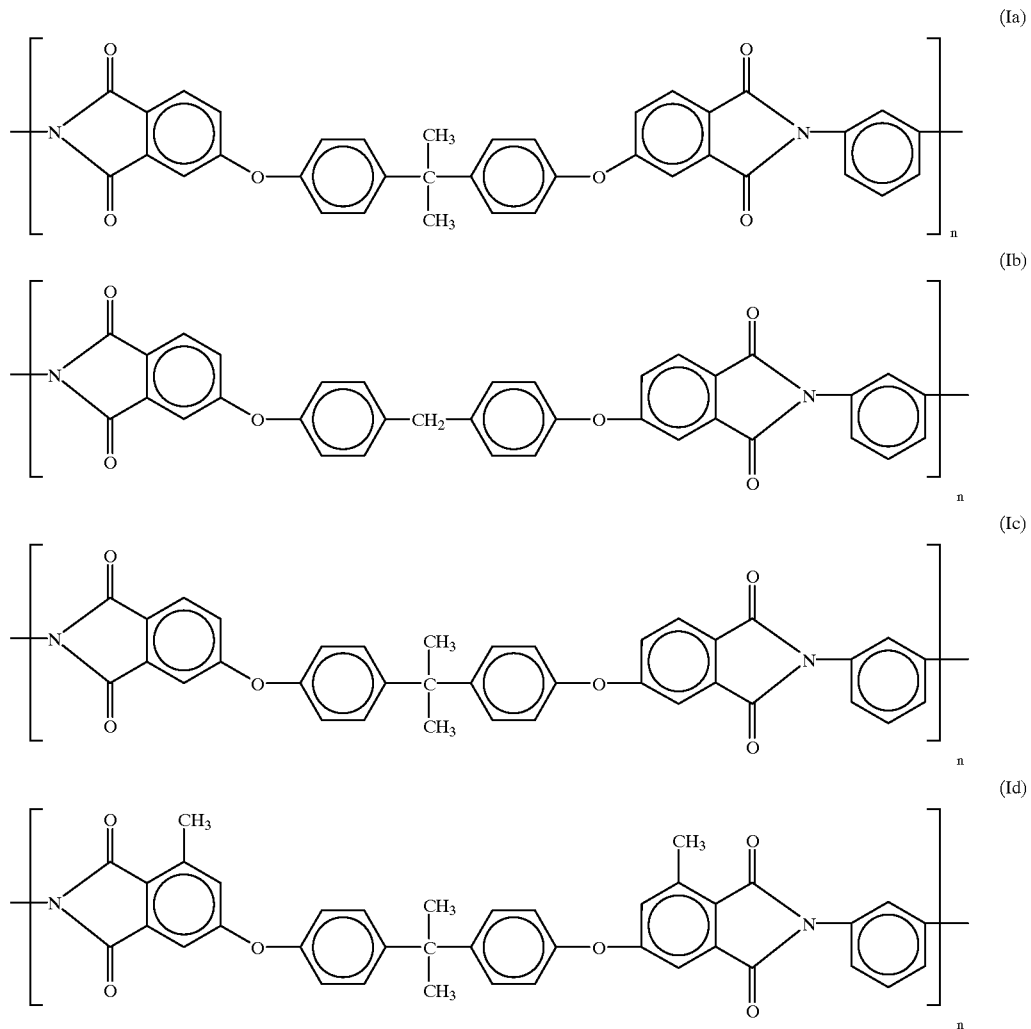

Examples of polyether sulfones are polymers of structures expressed by the following formulae (IIa) to (IIe) where n is an integer of 10 to 1,000. Of these polyether sulfones, the polymer of the formula (IIa) is commercially available (trade name "Sumika Excel", SUMITOMO CHEMICAL). The polymers of the structures represented by the formulas (IIb) to (IIe) are either publicly known, or can be prepared by publicly known methods. However, the polyether sulfones that can be used in the present invention are not restricted to them.

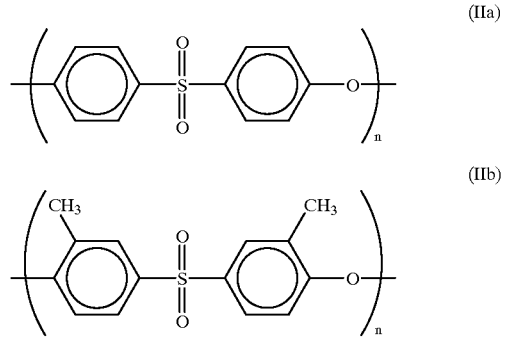

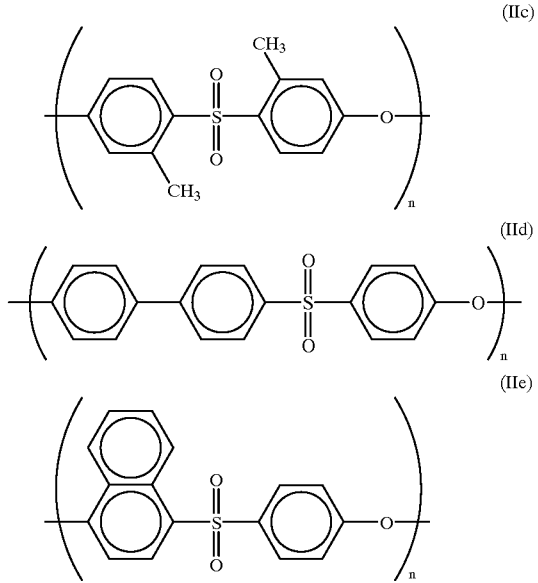

Examples of polysulfones are polymers of structures expressed by the following formulae (IIIa) to (IIIc) where n is an integer of 10 to 1,000. Of these polysulfones, the polymer of the formula (IIIa) is commercially available (trade name "Youdel", Teijin Amoco Engineering Plastics). The polymers of the structures represented by the formulas (IIIb) to (IIIc) are either publicly known, or can be prepared by publicly known methods. However, the polysulfones that can be used in the present invention are not restricted to them.

calcium carbonate, zinc carbonate, magnesium hydroxide, and mica. Since whisker is a single crystal needle-like crystal, it gives mechanical strength close to the theoretical value, and it is excellent in heat resistance, wear resistance and chemical resistance. Also, whisker is a short fiber with a fiber length generally of several $\mu$m to several hundred $\mu$m, and its aspect ratio is 30 to 300. The reason why such a whisker is suitable for the invention may be that basically, it can enhance isotropy. The addition of a fibrous material such as glass fiber or carbon fiber makes the anisotropy of resin high, if the resin is based on amorphous resin. Thus, it becomes difficult to achieve the aforementioned dimensional accuracy.

Excellent whiskers usable in the invention are, for example, potassium titanate, zinc oxide, silicon carbide and mica. The zinc oxide whisker, especially a tetrapod-shaped whisker, gave excellent results. Silica fine powder also gave excellent results, like the single crystal inorganic needle-like crystal. This additive is also characterized by the absence of anisotropy, small thermal expansion coefficient, and high mechanical strength.

As a further embodiment of the resin composition, a polyether imide, polyether sulfone or polysulfone resin composition containing a single crystal inorganic needle-like crystal produced a superb effect. When the resin composition is a polyether imide, polyether sulfone or polysulfone resin composition containing 20 to 60% by weight of a single crystal inorganic needle-like crystal, an excellent effect is obtained similarly.

In the present invention, the use of a thermoplastic resin is preferred if the problem of flash occurrence is considered. Especially the use of a thermotropic liquid crystalline total aromatic polyester is preferred. The use of such a thermotropic liquid crystalline total aromatic polyester causes no flash, and can achieve roundness and cylindricity which are

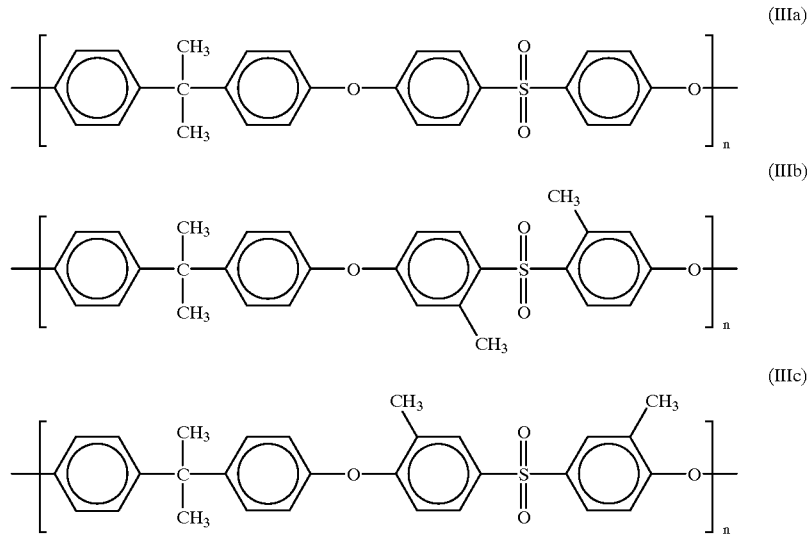

As for additives to be added to the resin, the addition of single-crystal inorganic needle-like crystals and/or fine silica powder among various additives are or is effective in attaining the object of the invention. A single crystal inorganic fine powder is called a whisker, and a ceramic series one is the main whisker known. Examples are zinc oxide, magnesium oxide, titanium oxide, aluminum oxide, potassium titanate, aluminum borate, silicon carbide, silicon nitride, graphite, not more than 1 $\mu$m as shown in Table 1. A liquid crystal polymer (LCP) generally shows liquid crystal properties in molten state, and thus its fluidity during molding is very satisfactory. Hence, the transfer of the resin to the mold is so good that high dimensional accuracy can be achieved. Furthermore, the pressure applied to the core pin during molding can be made low, so that a break or bend of the pin can be prevented, even if the fiber insertion hole is 3 mm or more long.

The thermotropic liquid crystalline total aromatic polyester is great in the shear stress dependency of viscosity. Thus, this polymer is poured into the mold of FIG. 5, and when its flow stops, it solidifies rapidly. Hence, even if several μm clearance exists between the core pin tip and the pin catcher, the arrival of the resin at this clearance is prevented to avoid the problem of flash.

Liquid crystal polymers of different structures have been synthesized, and the values of their physical properties vary greatly with the chemical structure. As shown in Table 2, liquid crystal polymers can be classified, for convenience's sake, into three types according to the deflection temperature under load (TDUL).

graphite, calcium carbonate, zinc carbonate, and magnesium hydroxide. However, fibrous additives such as glass fiber and carbon fiber are not used. The amount of the additive added is determined in a range in which the fluidity of the resin is not decreased. This amount can be selected suitably within the range of from 20% to 70%, preferably from 30% to 60%. The term "roundness" refers to deviation from the center of a reference circle which is a circle with a diameter of 2.5 mm.

The present invention also focuses on "anisotropy" of the resin composition, and has found that when the orientation of the resin is in a suitable range, a very good plastic ferrule can be obtained. To evaluate the "anisotropy" of the resin composition, it is appropriate to use the ratio between the values of the physical properties of the resin in the flowing direction and the direction perpendicular to the flowing

TABLE 2

Type and structure of liquid crystal polymer

| Type | TDUL (° C.) | Typical structure |
|---|---|---|
| I | 260–350 | [structure] |
| II | 190–250 | [structure] |
| III | 60–230 | [structure] |

Notes: x, y and z denotes integers.

In the present invention, the use of the type I or II polymer having a total aromatic structure is preferred because of its excellency in heat resistance and various types of reliability. The total aromatic structure refers to a structure in which every recurring unit has an aromatic ring, and the same recurring unit does not contain a chain linkage comprising two or more atoms bonded one after another in a chain form. Details of the total aromatic polyester are described in Japanese Patent Application Publication No. 69203/1993.

In the present invention, it is preferred to use, as an additive to the resin, an additive which reduces the orientation of the thermotropic liquid crystalline total aromatic polyester. The orientation of the liquid crystal polymer is generally high, so that roundness and cylindricity tend to decrease near the tip portion of the ferrule, i.e., the site where the wall thickness becomes nonuniform. Because of this problem, it is preferred to use an additive for reducing the orientation of the resin. Concretely, various inorganic additives are enumerated, such as glass beads, silica beads, graphite, zinc oxide, potassium titanate, zinc oxide, magnesium oxide, titanium oxide, aluminum oxide, potassium titanate, aluminum borate, silicon carbide, silicon nitride, direction when the resin composition is injection molded. Preferably, the resin composition having this ratio of 5 or less is used (however, the "ratio" referred to herein is that obtained by dividing the larger value by the smaller value). In regard to the product configuration for evaluating anisotropy, it is possible to use an ASTM test sample for use in the evaluation of a resin's physical properties, or a flat plate (e.g., 60×60×3 mm). In either case, a mold structure having a gate in an end face is suitable. After molding, a test piece of a suitable shape is cut out of the molded product by cutting it in the flowing direction of the resin and in the direction perpendicular to the flowing direction. Then, the physical properties of the test piece are evaluated, whereby the anisotropy of the resin composition can be found. The higher the ratio, the more the resin is oriented in the flowing direction. The physical properties may be linear expansion coefficient, mold shrinkage coefficient, and flexural modulus, of which linear expansion coefficient can be used most preferably. With a liquid crystal polymer, the linear expansion coefficient in the flowing direction is normally larger than that in the direction perpendicular to it. In the present invention, the anisotropy of from 2 to 5 has been found to give excellent results. If the anisotropy is more than 5, the roundness is 1 μm or more, thereby decreasing the molding accuracy. This may be because when the anisotropy of the resin is great, the flow of the resin or the shrinkage at cooling is nonuniform, leading to a decrease in the molding accuracy. Generally, when the anisotropy of resin is high, the linear expansion coefficient in the flowing direction lowers. For an optical connector ferrule, it is desirable that the linear expansion coefficient of the resin be so low as to become close to the linear expansion coefficient of a silica optical fiber. If the anisotropy of the resin is less than 2, on the other hand, the linear expansion coefficient goes beyond $1.5 \times 10^{-5}$, the limiting value required in temperature and humidity cycling test to be described later on.

Figure 6A:
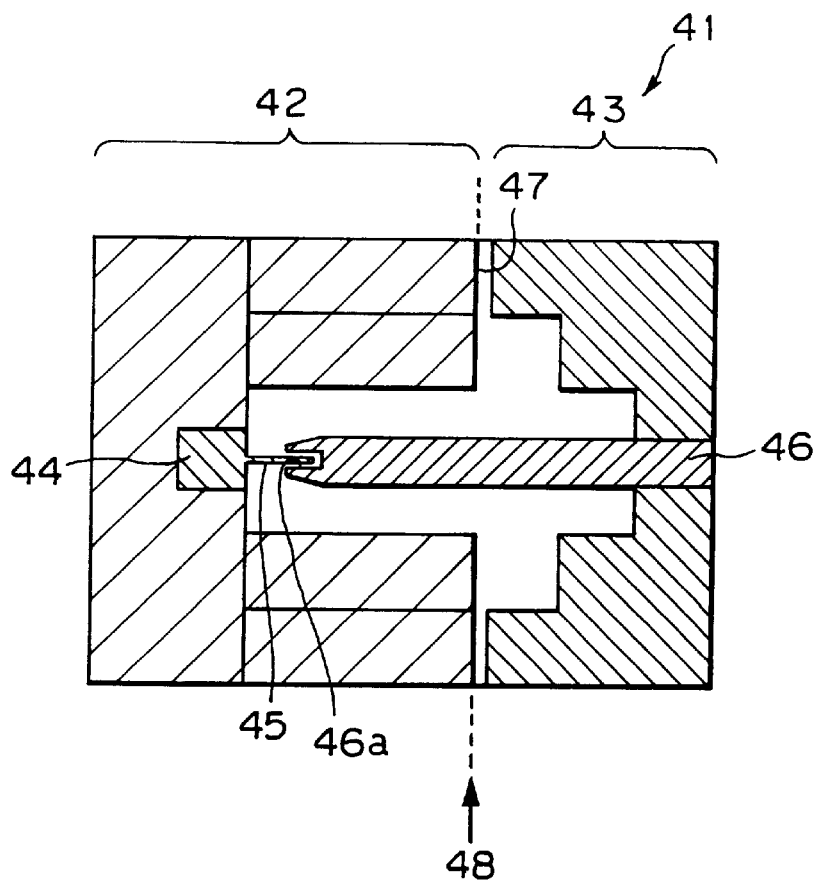
FIGS. 6A and 6B are sectional views of a mold for plastic ferrule molding which is used in the present invention.
Figure 6B:
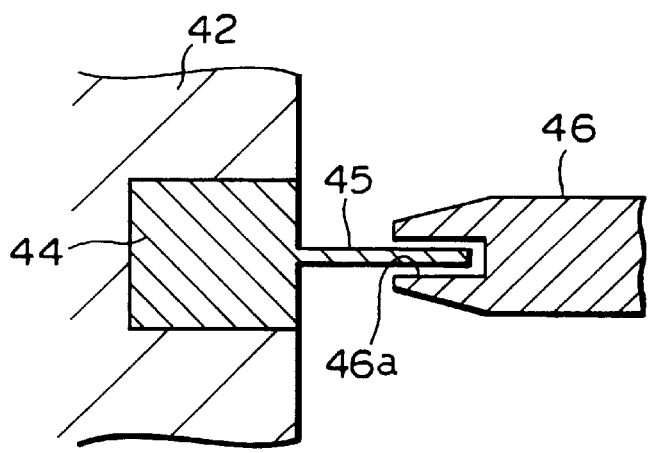
Figure 7:
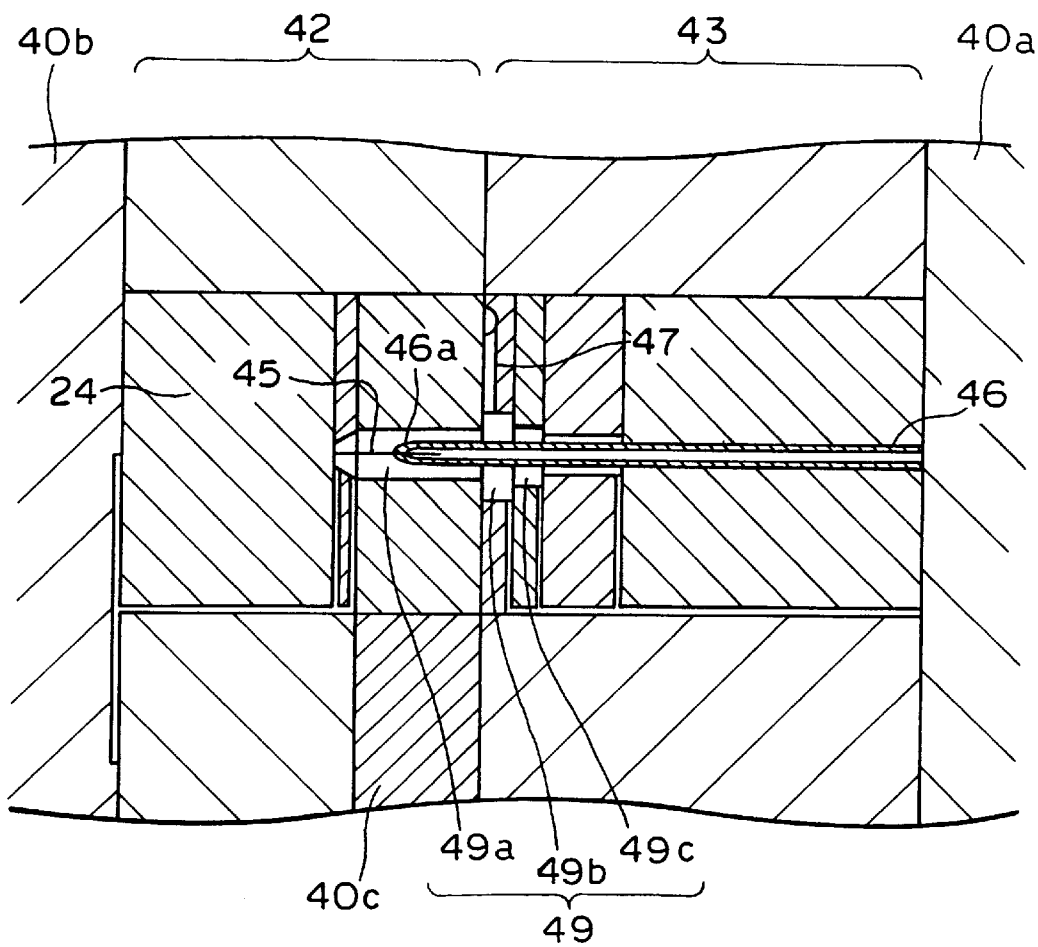
FIG. 7 is a sectional view of a mold for ferrule molding which is used in the present invention.

When a ferrule is formed by using a thermotropic liquid crystalline total aromatic polyester, the structure of the ferrule is not restricted to the one of FIG. 3, as long as the resin composition further contains an additive for reducing the orientation of the thermotropic liquid crystalline total aromatic polyester and the anisotropy of the resin is 2 to 5. Provided these conditions are met, a ferrule of any structure can attain the object of the present invention. For example, a resin composition containing a thermotropic liquid crystalline total aromatic polyester and an additive for reducing the orientation of the thermotropic liquid crystalline total aromatic polyester, and having the anisotropy of the resin of 2 to 5 is injected into a mold of a structure as illustrated in FIG. 6 or 7 to form a ferrule. The resulting ferrule gives the excellent effects of the invention. FIG. 6A is a sectional view showing the whole of this mold 41, while FIG. 6B shows the essential part of the mold. FIG. 7 shows the mold of FIG. 6 adapted to form a taper, as a view in which the mold is attached to mounting plates 40a, 40b.

In the mold 41, a core pin 44 is fixed to a fixed-side mold 42. However, the core pin 44 has a thin pin 45 for forming an optical fiber insertion hole. A pin catcher 46 for forming a coated optical fiber guide hole is fixed to a movable-side mold 43, and accepts the thin pin 45 during clamping of the molds. That is, a columnar groove 46a is present in the front end portion of the pin catcher, and the thin pin 45 is held there out of contact with its inside. In the drawing, the numeral 47 denotes a resin inflow portion, 48 a parting line, and 40c a gauge for eccentricity adjustment. During clamping, a cavity 49 is defined between the movable-side mold 43 and the fixed-side mold 42.

Molten resin is injected into the molds through the resin inflow portion 47. The resin introduced into a first cavity 49a forms a cylindrical portion of a ferrule, the resin introduced into a second cavity 49b forms a holding portion, and the resin introduced into a third cavity 49c forms an guiding portion.

A ferrule was formed using the mold of FIG. 6, and measured for the roundness and the linear expansion coefficient in the flowing direction. The results are depicted in FIGS. 8 and 9.

Figure 8:
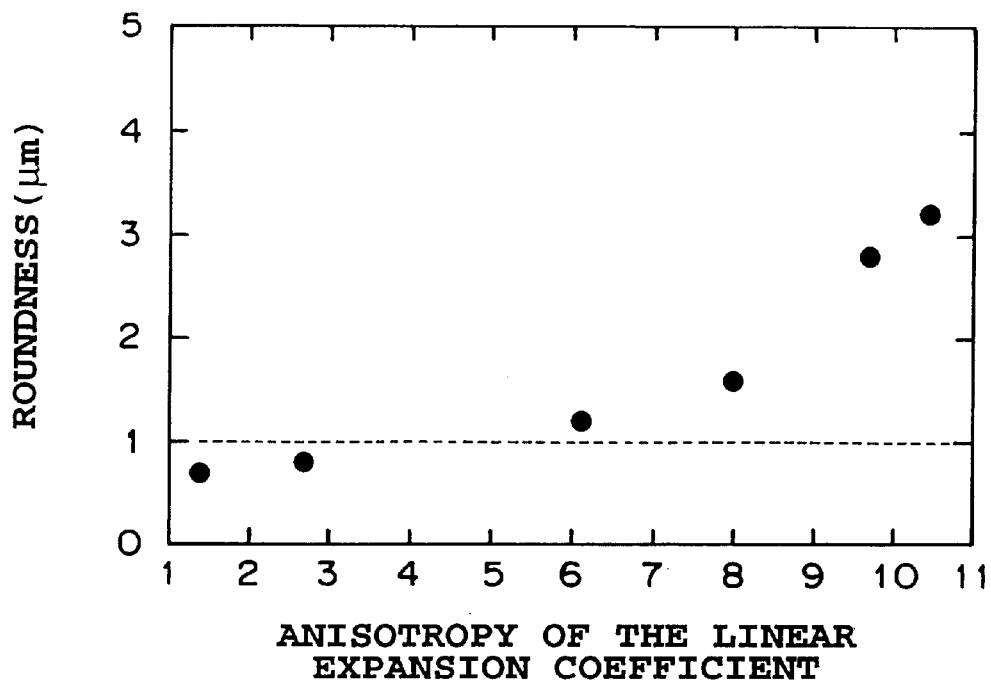
FIG. 8 is a graph showing the relationship between the anisotropy of the linear expansion coefficient and the roundness of a resin composition.

FIG. 8 shows the roundness at a site 4 mm apart from the tip of the ferrule. When the anisotropy exceeds 5, the roundness is 1 μm or more, resulting in decreased molding accuracy. A plastic ferrule has a slightly wide margin in comparison with zirconia. If the roundness of 1 μm or less can be achieved, therefore, the required connecting characteristics are obtained.

Figure 9:
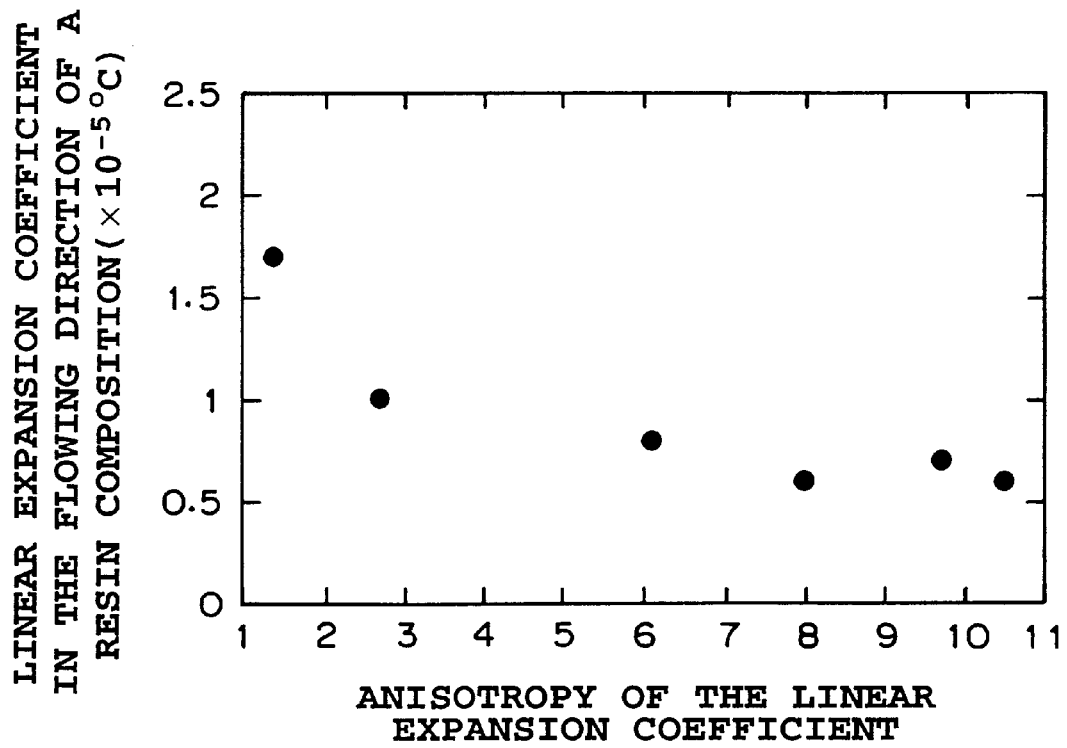
FIG. 9 is a graph showing the relationship between the anisotropy of the linear expansion coefficient and the linear expansion coefficient in the flowing direction of a resin composition.

FIG. 9 shows the relationship between the anisotropy and the linear expansion coefficient in the flowing direction of a resin composition. When the anisotropy of the resin is less than 2, the value of the linear expansion coefficient in the flowing direction exceeds $1.5 \times 10^{-5}$, the value required in reliability in temperature and humidity cycling test.

The amount of the additive added to decrease the orientation of the thermotropic liquid crystalline total aromatic polyester added varies with the type of the additive. Thus, a resin composition containing the additive so as to give anisotropy of 2 to 5 is used. Japanese Patent Application Publication No. 69203/1993 discloses an example of adding various additives to the thermotropic liquid crystalline total aromatic polyester. These additives, however, include some additives which increase the anisotropy of the resin composition. They are not based on our idea of imparting anisotropy of 2 to 5 as in the present invention. Thus, the roundness is 2 μm or more in Japanese Patent Application Publication No. 69203/1993. The resin composition of the present invention may, if desired, contain additives such as surface treating agents, colorants, or mold release agents. For the mold used in the invention, in particular, the addition of a mold release agent is effective.

(4) Control of Eccentricity

The use of a mold of the structure shown in FIG. 5, for example, can suppress fluctuations in eccentricity during molding. However, the absolute value of eccentricity does not necessarily become zero. That is, even if the manufacturing accuracy of mold parts is maximized and their eccentricity is set at zero on the parts level, clearance of at least 1 to 2 μm is necessary to combine mold parts. Depending on the state of assembly of the molds, therefore, the amount of eccentricity that can be expected is not necessarily level zero, but some eccentricity arises. Thus, in regard to eccentricity characteristics, the provision of a mechanism for controlling the amount of eccentricity is necessary for making the present invention more effective. This invention uses the following two mechanisms for adjusting the amount of eccentricity, thereby reducing it.

(A) A mechanism for controlling resin flow is provided in part of a runner, a flow channel for a resin to be charged into a mold.

Figure 10A:
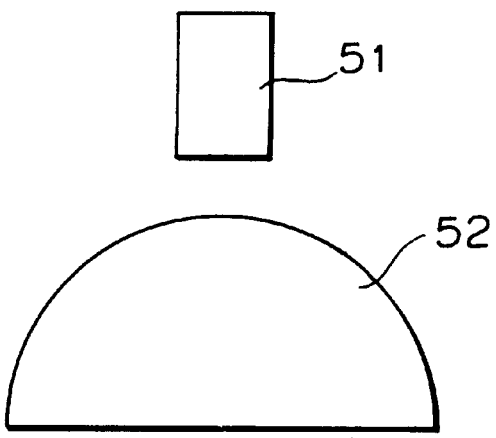
FIGS. 10A–10C are view illustrating a mechanism for controlling the flow of a resin used in the present invention.
Figure 10B:
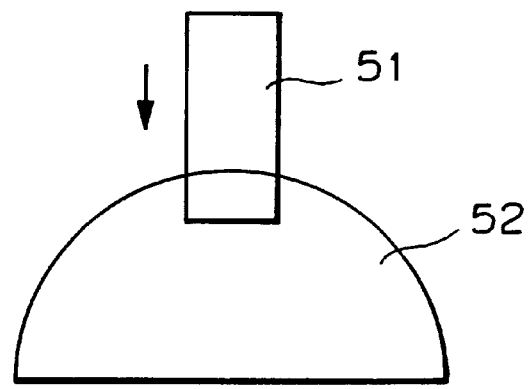
Figure 10C:
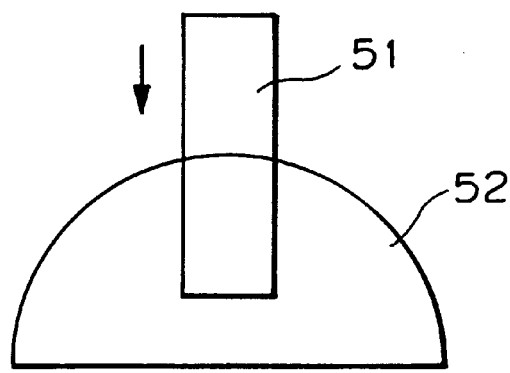

Specifically, as shown in FIGS. 10A to 10C, a method of pushing a small-diameter pin 51 into a runner 52 can be applied. FIG. 10A illustrates a state in which the pin is not inserted. In the order shown in FIGS. 10B and 10C, the pin is inserted deep into the runner to affect the flow of the resin. This method can control the amount of eccentricity within the range of ±3 μm.

(B) A mechanism for changing the relative positions of a cavity and a core pin is provided.

Figure 11:
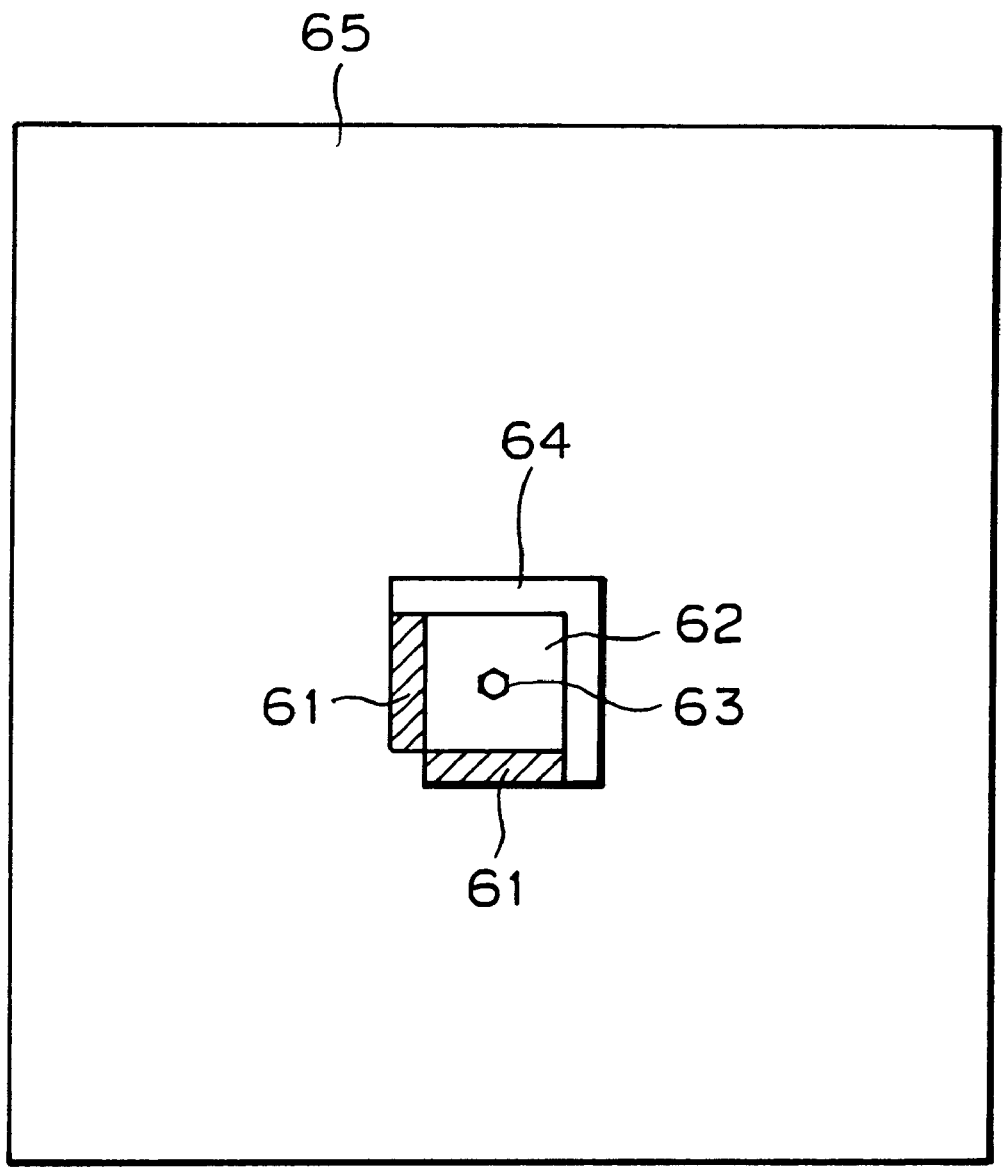
FIG. 11 is a view showing the structure of a mold on the fixed side which is used in the present invention for controlling eccentricity.

Concretely, a cavity part is configured as in FIG. 11 to fix the position of a core pin and change the position of a cavity. By varying the thickness of a gauge 61 to be inserted, the position of a cavity center 63 of a cavity part 62 can be changed. With this technique, eccentricity can be adjusted within the range ±10 μm. In the drawing, the numeral 64 denotes an adjusting space, and 65 a mold base.

The present invention may use the methods (A) and (B) jointly.

As has been presented in Table 1, a zirconia ferrule requires eccentricity of less than 0.7 μm. In the case of a plastic ferrule, on the other hand, the same characteristics can be achieved with eccentricity of not more than 1 μm. This is because a highly rigid material such as zirconia undergoes no deformation of a ferrule itself, while a plastic material can be expected to exhibit certain elastic deformation, thus somewhat broadening the tolerance for the amount of eccentricity.

Figure 12:
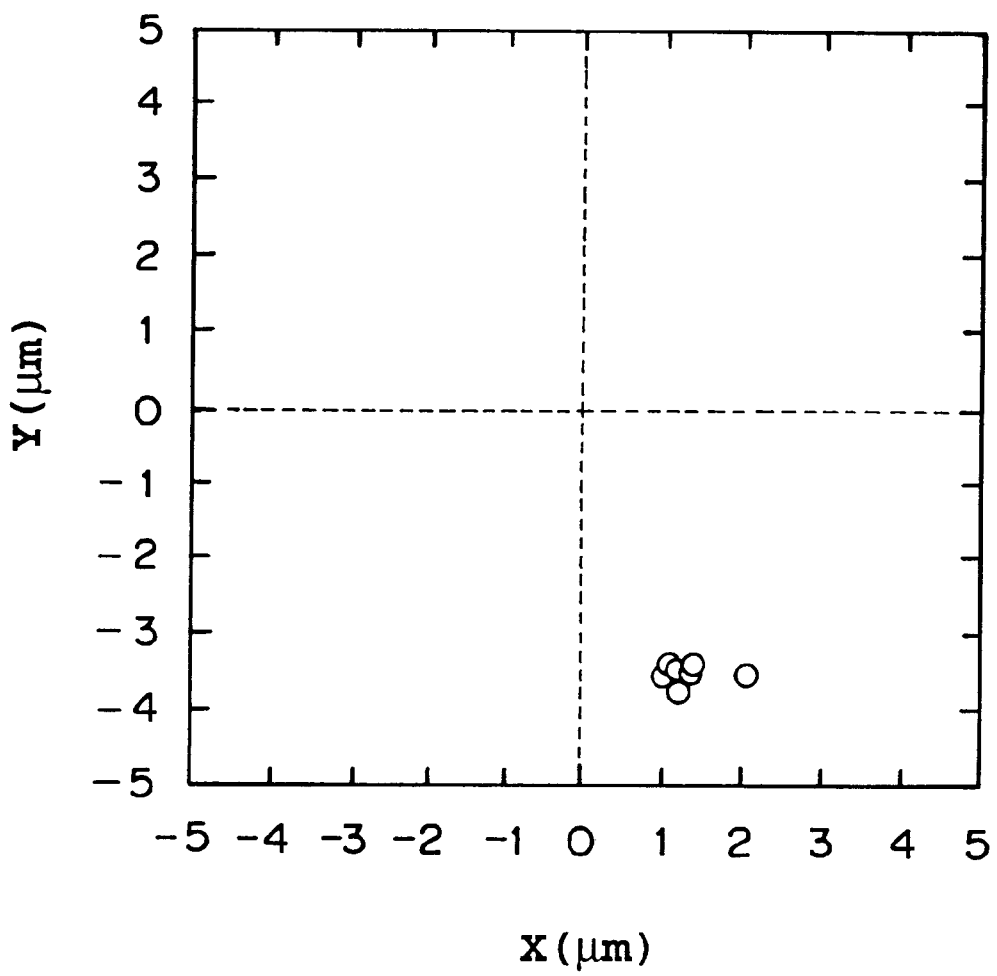
FIG. 12 is a graph showing the eccentric position of a ferrule.

In the present invention, a mark for indicating the position of a molded ferrule in a mold is preferably provided in part of a holding portion or guiding portion of the ferrule. The reasons are as follows:

That is, as shown in FIG. 12, the eccentric position of the ferrule tends to be concentrated at a certain position. FIG. 12 presents the results of measurement of the eccentric position of a ferrule of the structure of FIG. 6 which was molded from a resin composition containing a thermotropic liquid crystalline total aromatic polyester and an additive for reducing the orientation of the thermotropic liquid crystalline total aromatic polyester, and having anisotropy of 2 to 5. Eccentricity of 3.7 µm on the average occurs, but variations in eccentricity are very small, and the deviation is 0.2 µm. The same holds true when control of eccentricity is performed. When optical PC (Physical Conatact) connection is carried out using the ferrule of the present invention, for example, there is a case in which two ferrules are opposed to each other in the same positional relationship with their positions in the mold as a reference. In this case, the relative positional relationship of optical fibers becomes the closest, decreasing the connection loss. After the ferrule is pushed out of the mold and the sprue and runner are treated, nothing indicates the position of the ferrule in the mold. Thus, if the aforementioned mark is provided in part of the ferrule other than the cylindrical portion, its position is referred to so that the ferrules can be opposed to each other. This "aligning procedure" can be realized only by the plastic ferrule of the present invention provided with a registration mark. With a conventional ferrule, the eccentricity of each ferrule mounted with a fiber is measured individually, the ferrule is marked based on the results, and alignment is performed with reference to the marked position. The use of a ferrule with a marking as in the invention requires no such a conventional procedure, and thus enables an optical connector to be provided at a low cost.

In molding production, attention should be paid to the surface accuracy of the mold surface and the registration accuracy on the parting surface. To increase the registration accuracy, a structure with a spigot joint portion is available, or a taper pin or a cotter block may be provided. Either method can be selected where necessary. The type of a gate for introducing a resin into a mold is a pin point gate, a ring gate or a film gate, and any of them can be selected according to the gate position. As the injection conditions, "a fast injection molding technique (injection pressure is decreased)" involving a higher injection speed, or "a slow injection molding technique" involving as low an injection speed as possible for decreasing distortion after molding can be utilized according to the need.

The molding machine usable is a small injection molding machine with a relatively low mold clamping pressure (50 t or less). Normally, there can be used a publicly known hydraulic injection molding machine, an electrically actuated injection molding machine with a servomotor as a drive source, or a hybrid type device having a hydraulic system/ electric feed system on the injection side/clamping side. Utmost care should be taken in the molding machine for the parallelism between a moving plate moving with the mold attached and a fixed plate. Poor parallelism results in decreased registration accuracy of the molds, which is unsuitable for precision molding. Parallelism is defined as an error in the distance between both plates, and its value should be at least within 50 µm, preferably within 30 µm.

The plastic ferrule of the present invention can be utilized for products related to an SC connector. It is applicable to an adapter for a double ended plug cord and a junction in an optical module. Basically, this ferrule can be applied to all optical connectors (FC connector, ST connector) with a ferrule outer diameter of 2.5 mm.

From now on, optical interconnection is expected to find use in various information processors, and numerous optical connectors and ferrule parts will become necessary.

EXAMPLES

EXAMPLE 1

Figure 13:
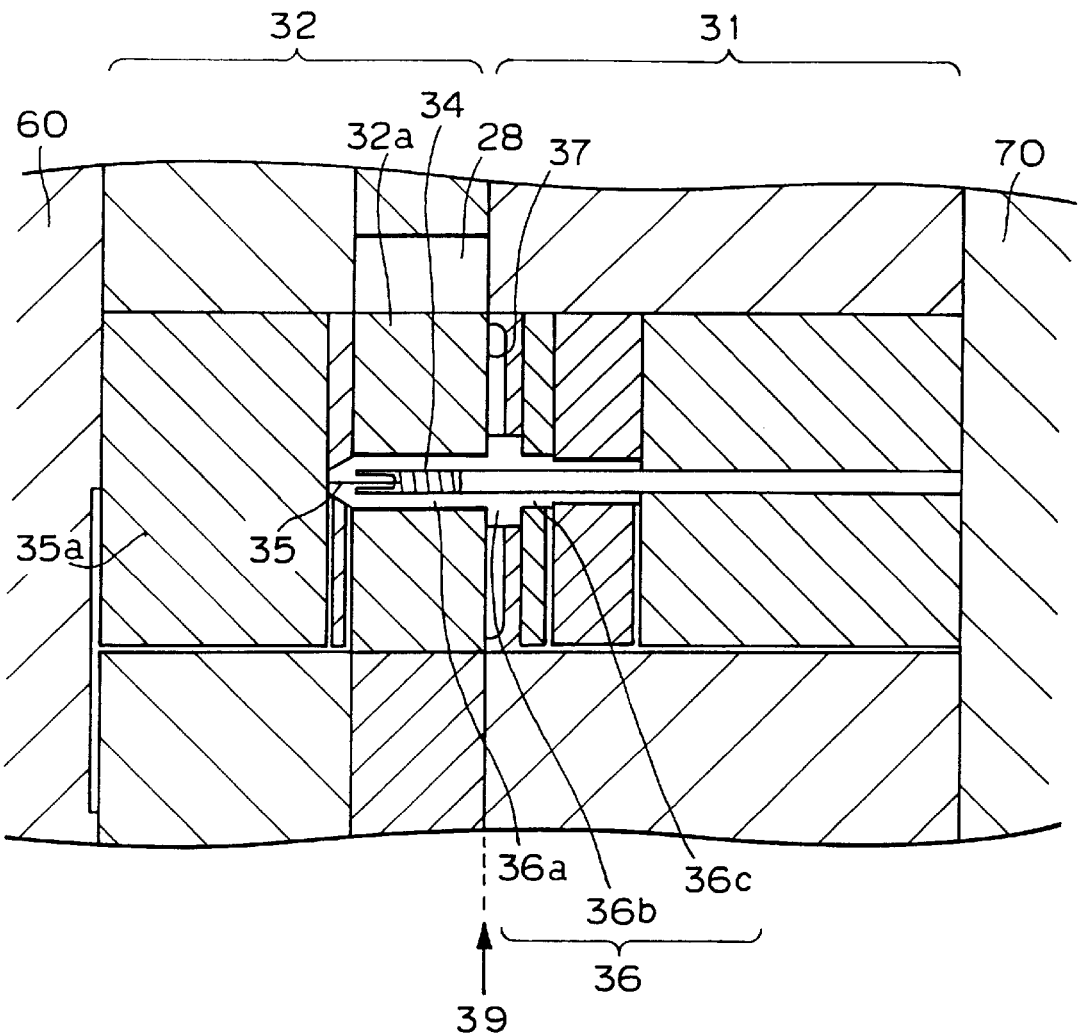
FIG. 13 is a sectional view of the whole of a mold for ferrule injection molding which is used in the present invention.
Figure 14:
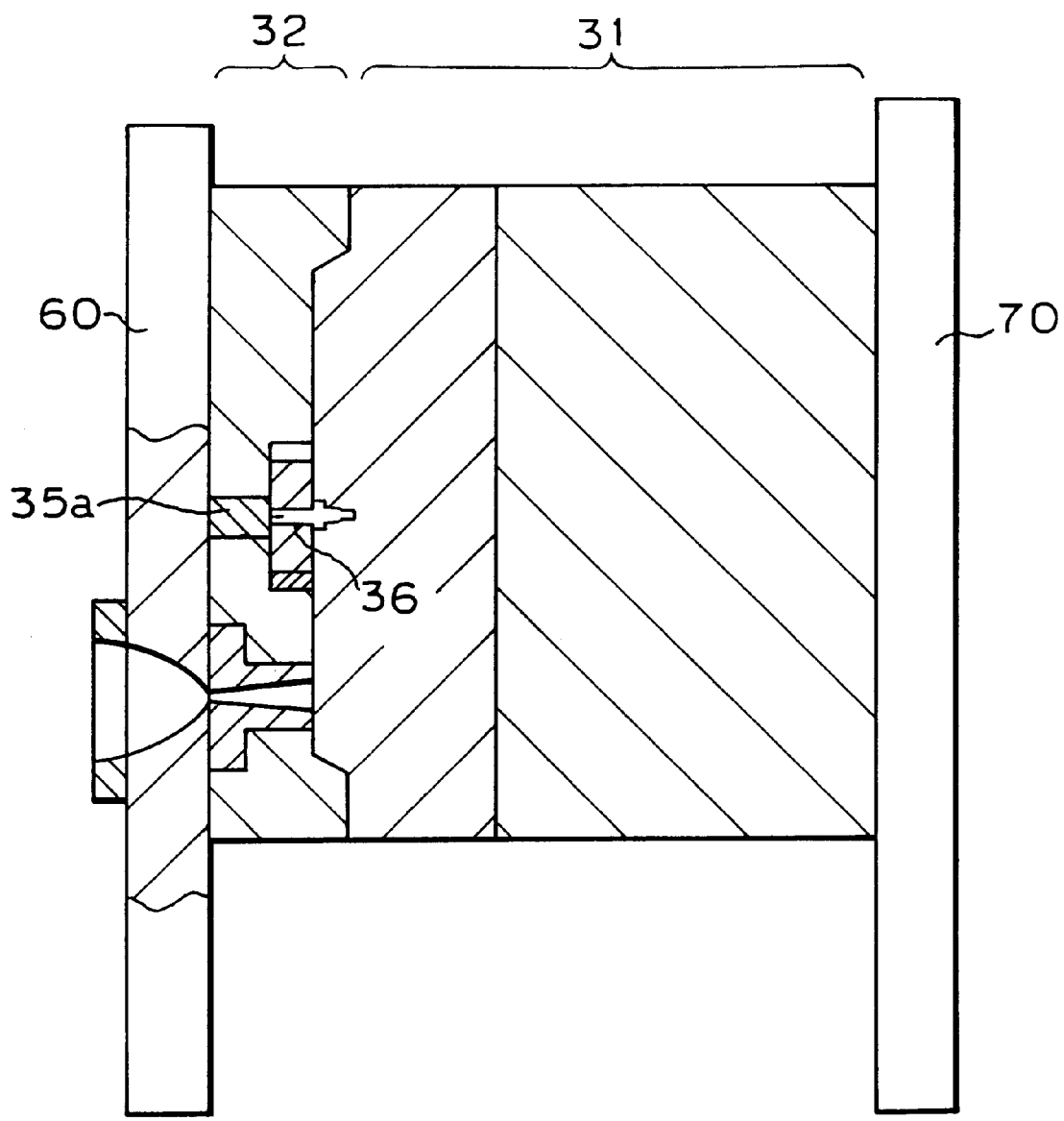
FIG. 14 is a sectional view of the essential part of the mold for ferrule injection molding which is used in the present invention.

A plastic ferrule was molded using a mold for injection molding shown in FIGS. 13 and 14.

The length of a fiber insertion hole was set at 3.5 mm, and the taper angle of the tip portion was set at 40 degrees. A mold described in detail in FIGS. 13 and 14 is the same as the mold of the present invention illustrated in FIG. 5. Thus, the same parts as in FIG. 5 were assigned the same numerals. During clamping, a cavity 36 was formed between a movable-side mold 31 and a fixed-side mold 32, and a thin pin 35 of a fixed core pin 35a was fitted into one end of a through-hole of a pin catcher 34 so as to be supported at both ends thereof. From this state, a shift to an injection step was made, and molten resin was injected through a gate 37 into the cavity 36. The resin was divided and moved to the right and the left. Molten resin charged into a second cavity 36b formed a holding portion of a ferrule, molten resin charged into a third cavity 36c formed an guiding portion of the ferrule, and molten resin charged into a first cavity 36a formed a cylindrical portion of the ferrule. At the center of the cavity, a fiber insertion hole and a coated fiber guide hole were formed. The movable-side mold 31 and the fixed-side mold 32 were fixed to a clamping platen of an injection molding machine (not shown) via a movable-side mounting plate 70 and a fixed-side mounting plate 60. The molding materials used were as follows:

| | |
|---|---|
| Total aromatic thermotropic liquid crystal polyester (type II) | 50 parts by weight |
| Glass beads (average particle size 30 µm | 50 parts by weight |

The injection molding conditions are shown in Table 3.

TABLE 3

| Injection molding conditions | |
|---|---|
| Item | Conditions |
| Resin drying | 150° C., 5 hours |
| Cylinder temperature | |
| Rear portion | 280° C. |
| Intermediate portion | 280° C. |
| Nozzle portion | 300° C. |
| Mold temperature | 70° C. |
| Injection pressure | 800 kg/cm² |
| Screw back pressure | 80 kg/cm² |
| Holding pressure | 1200 kg/cm² |
| Injection speed | 5.7 cm/sec |
| Screw speed | 300 rpm |
| Injection time | 0.22 second |
| Metering time | 1.20 seconds |
| Follow-up pressure | 500 kg/cm² |
| Peak pressure | 995 kg/cm² |
| Cycle time | 30 seconds |

(A) Outer Diametral Configuration

Figure 15:
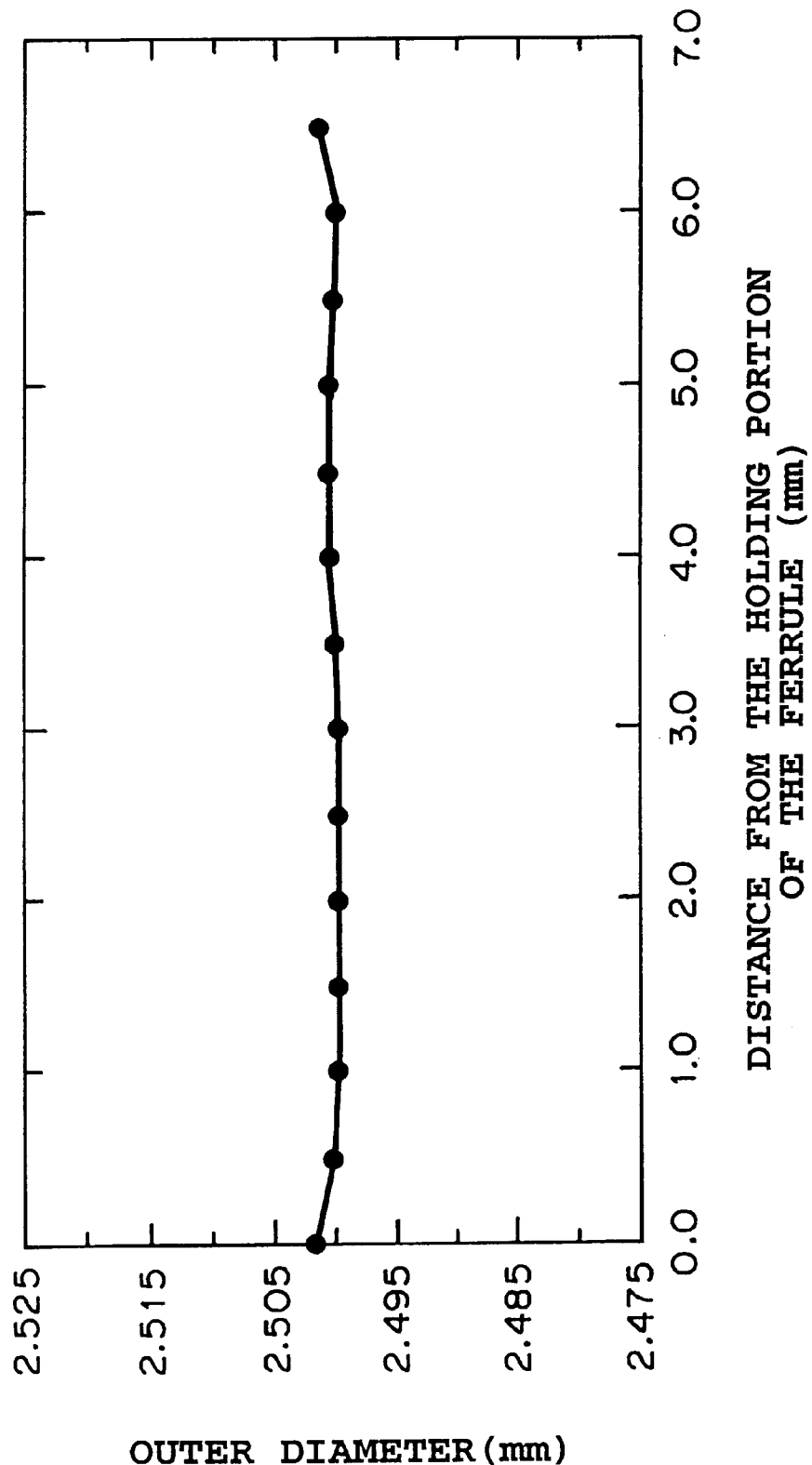
FIG. 15 is a view showing the outer diameter dimension of the ferrule of the present invention.
Figure 16:
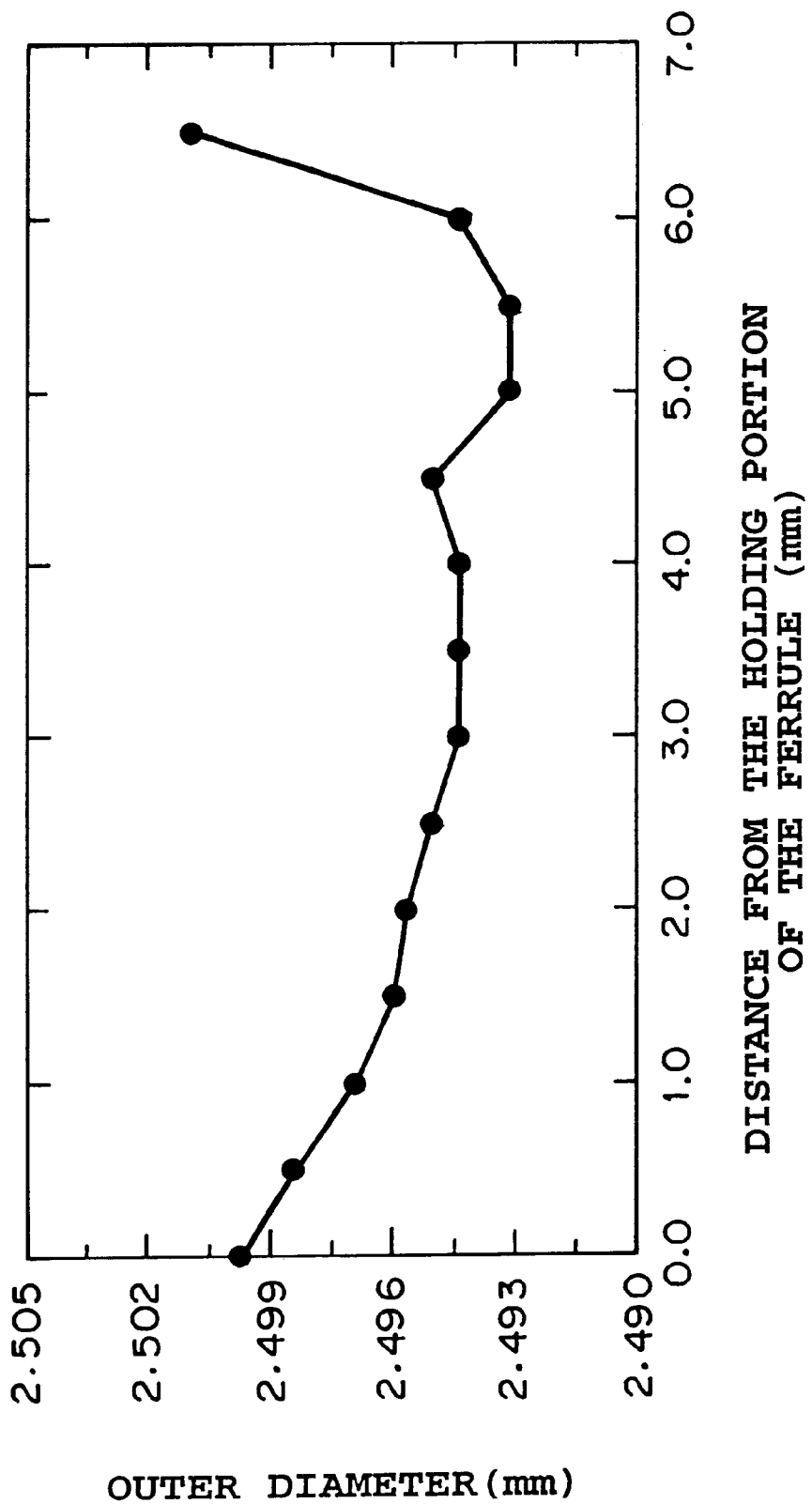
FIG. 16 is a view showing the outer diameter dimension of the conventional ferrule.

FIG. 15 shows the outer diameter of a plastic ferrule, prepared under the above-mentioned conditions, in the longitudinal direction ranging from the tip of the cylindrical portion to the holding portion. FIG. 16 shows the outer diameter of a plastic ferrule, prepared with the use of the resin other than total aromatic thermotropic liquid crystal polyester by a conventional method, in the longitudinal direction ranging from the tip of the cylindrical portion to the holding portion. As seen from FIGS. 15 and 16, the outer diameter of the conventional ferrule is not uniform, and varies widely particularly in the portions of the cylinder with a large resin wall thickness. In the ferrule of the present invention, by contrast, variations in the outer diametral shape are very small in the portions ranging from the tip of the cylindrical portion to the holding portion.

Figure 17:
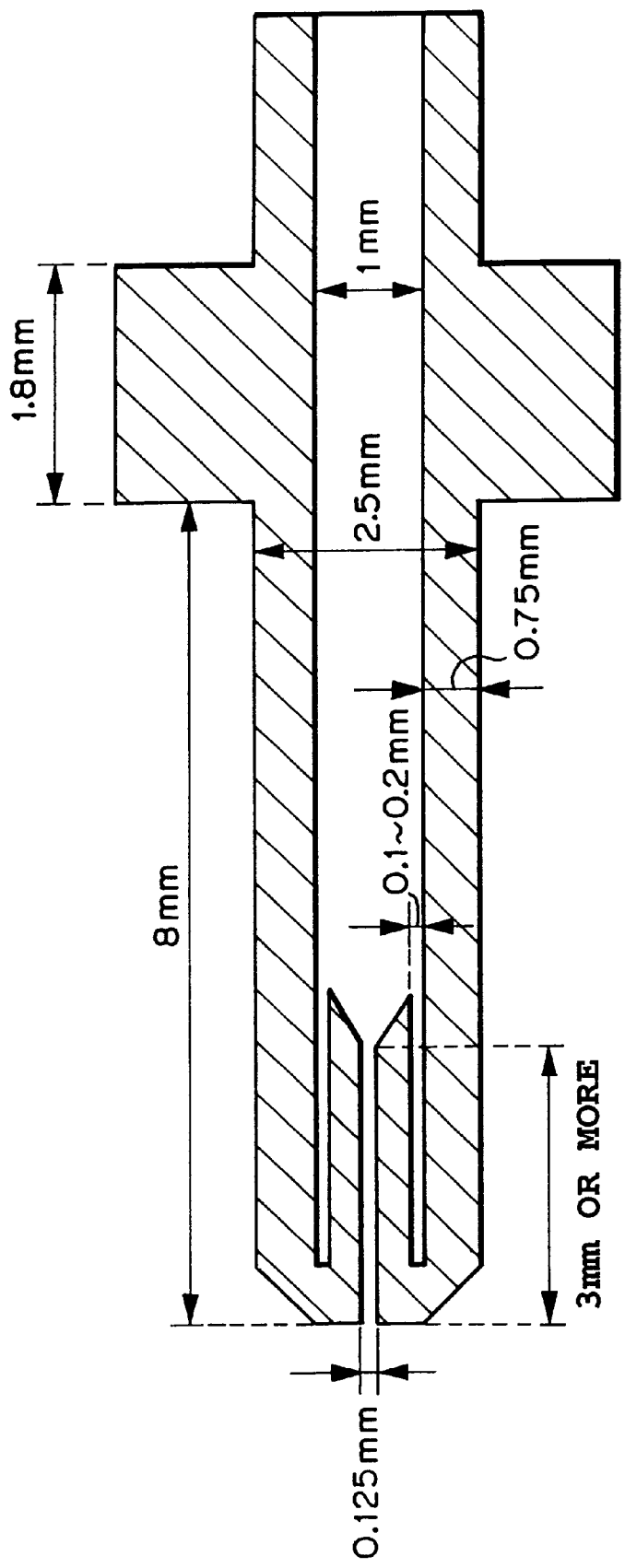
FIG. 17 is a sectional view of a plastic ferrule prepared by an Example.

FIG. 17 is a sectional view of the plastic ferrule prepared under those conditions.

(B) Connection Loss

Optical connectors (SC type) were assembled using the plastic ferrules molded using the mold of FIG. 6 and the plastic ferrules molded using the mold of FIG. 3, and measured for the connection loss. These molding materials used were the same as the above total aromatic thermotropic liquid crystal polyester and so on. The plastic ferrule molded using the mold of FIG. 6 and the plastic ferrule molded using the mold of FIG. 3 each had eccentricity of 0.5 μm. Grinding was AdPC grinding. The value of connection loss anticipated theoretically from the eccentricity of 0.5 μm is about 0.05 dB. The connection loss of the optical connector using the ferrule molded using the mold of FIG. 6 was 0.2 dB, a value greater than the theoretically expected value. By the way, a plastic ferrule has eccentricity of 0.5 μm or less can not be prepared by a conventional method.

The connection loss of the optical connector using the ferrule molded using the mold of FIG. 3 was 0.13 dB. This value was higher than the value theoretically expected from eccentricity, but was smaller than that of the ferrule molded using the mold of FIG. 6. As noted from this, connection loss characteristics are improved by decreasing variations in the outer diameter of the ferrule. The connection loss of 0.5 dB or less is not problematical for practical use. A ferrule with eccentricity of 1.0 μm or less can be obtained in 80% yield when a ferrule is molded by using the mold of FIG. 3, but in 30% yield when a ferrule is molded by using the mold of FIG. 3. The ferrule of the invention, gave a connection loss of 0.25 dB even when it had eccentricity of 1 μm. This ferrule was fully feasible.

Figure 18A:
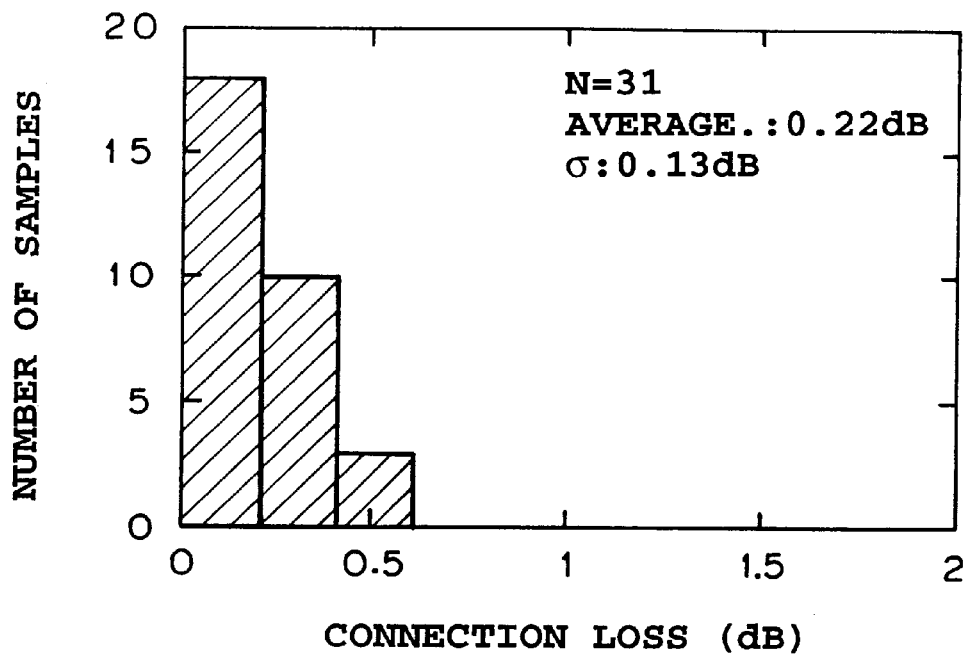
FIGS. 18A and 18B are graph showing the connection loss.
Figure 18B:
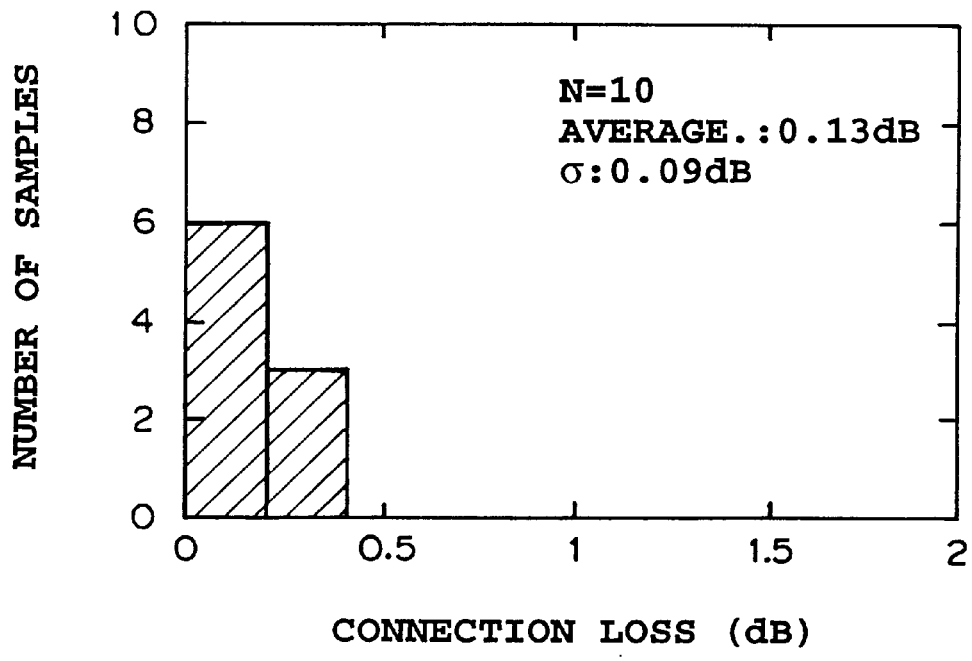
Figure 19A:
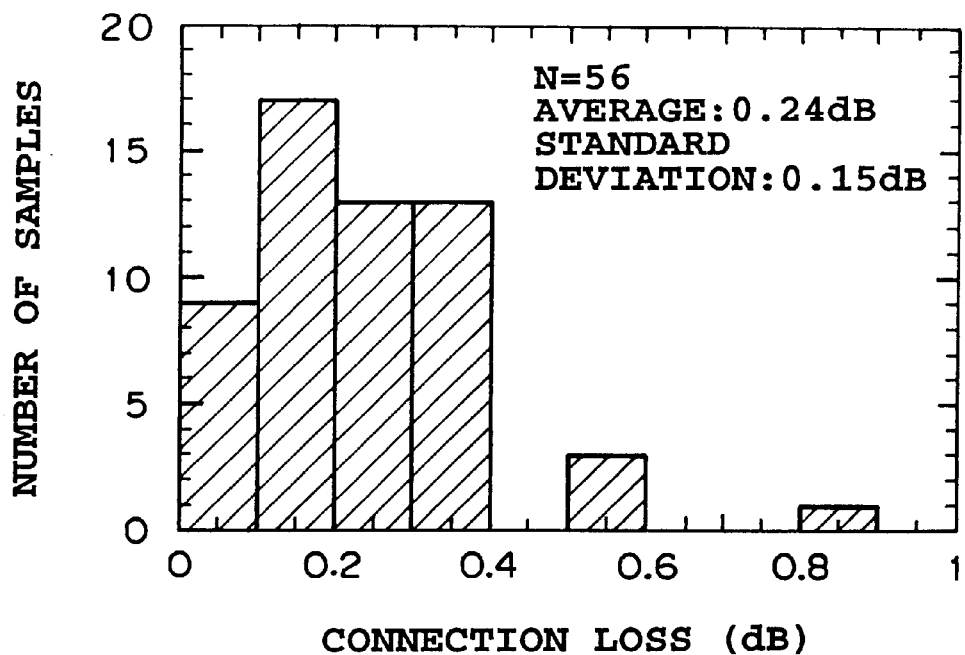
FIGS. 19A and 19B are graph showing the connection loss of random connection.
Figure 19B:
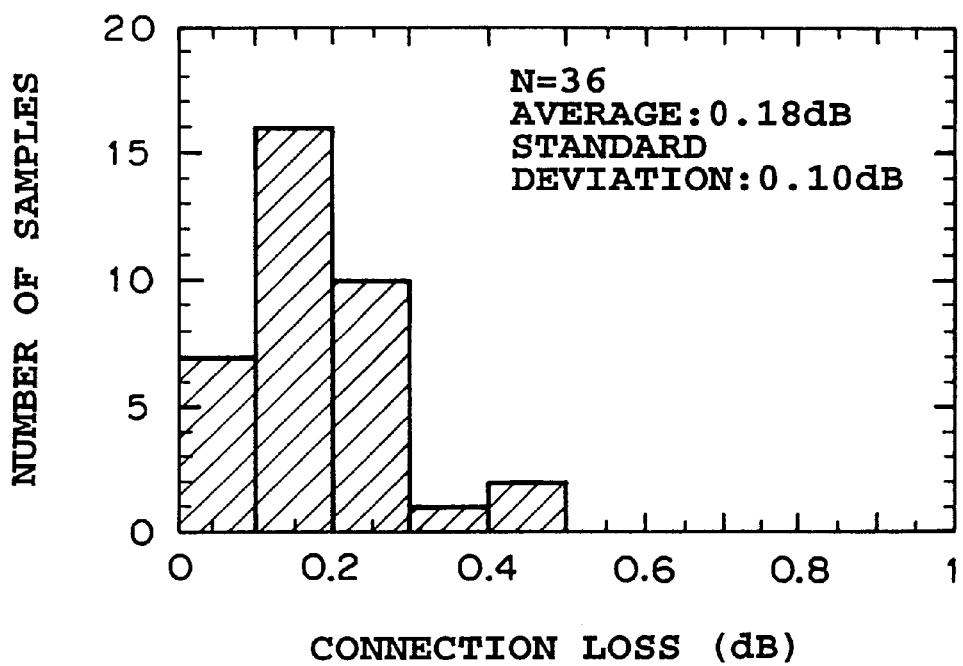

FIGS. 18A and 18B show connection loss caused when a commercially available ferrule (zirconia or the like) and a plastic ferrule were connected together by a commercially available zirconia split alignment sleeve. FIG. 18A shows connection loss obtained when the plastic ferrule was a ferrule molded using the mold of FIG. 6. FIG. 18B shows connection loss for the ferrule of FIG. 3. FIGS. 19A and 19B show connection loss for random connection of two plastic ferrules connected by a commercially available zirconia split alignment sleeve. FIG. 19A shows connection loss for the ferrule molded by the mold of FIG. 6. FIG. 19B shows connection loss for the ferrule of FIG. 3. As seen from FIGS. 18 and 19, these connectors all exhibited connection loss of 0.5 dB or less. They had the excellent effect of the present invention, and were producible in high yields.

Figure 20:
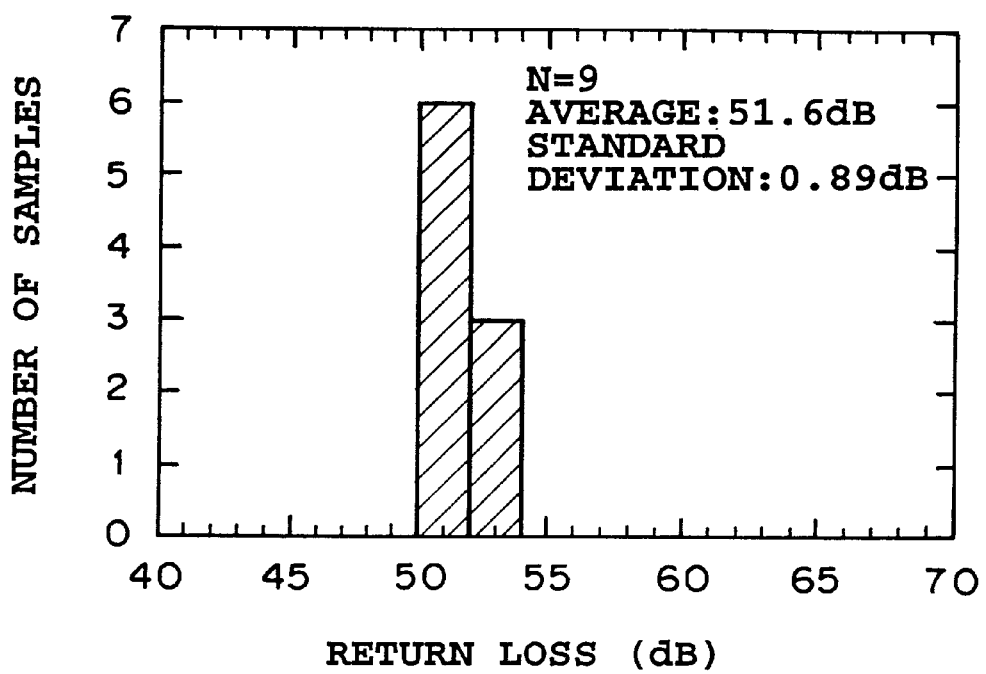
FIG. 20 is a graph showing the return loss.

Furthermore, the ferrule of the invention could be subjected to AdPC grinding, and showed satisfactory reflection characteristics as represented by return loss of 51.6 dB on the average (FIG. 20). FIG. 20 shows the return loss for the ferrule molded using the mold of FIG. 3.

(C) Improvement in Reliability

Figure 21:
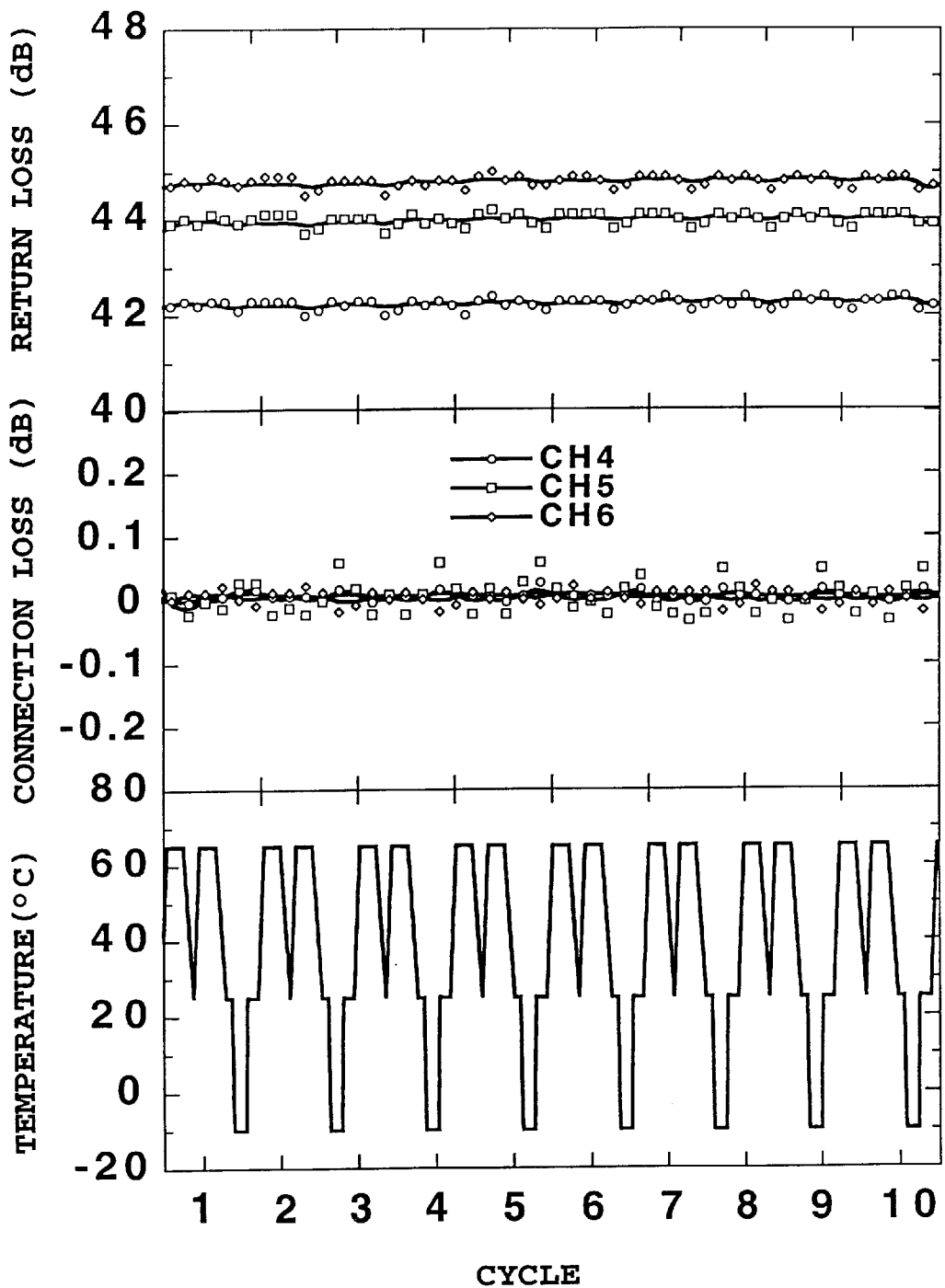
FIG. 21 is a graph showing the results of temperature and humidity cycling test.

FIG. 21 shows the results of temperature and humidity cycling test of the plastic ferrule according to the present invention. This ferrule involved few changes in characteristics, such as connection loss and return loss, associated with changes in temperature and humidity. Thus, the ferrule was found to have excellent weather resistance.

Figure 22:
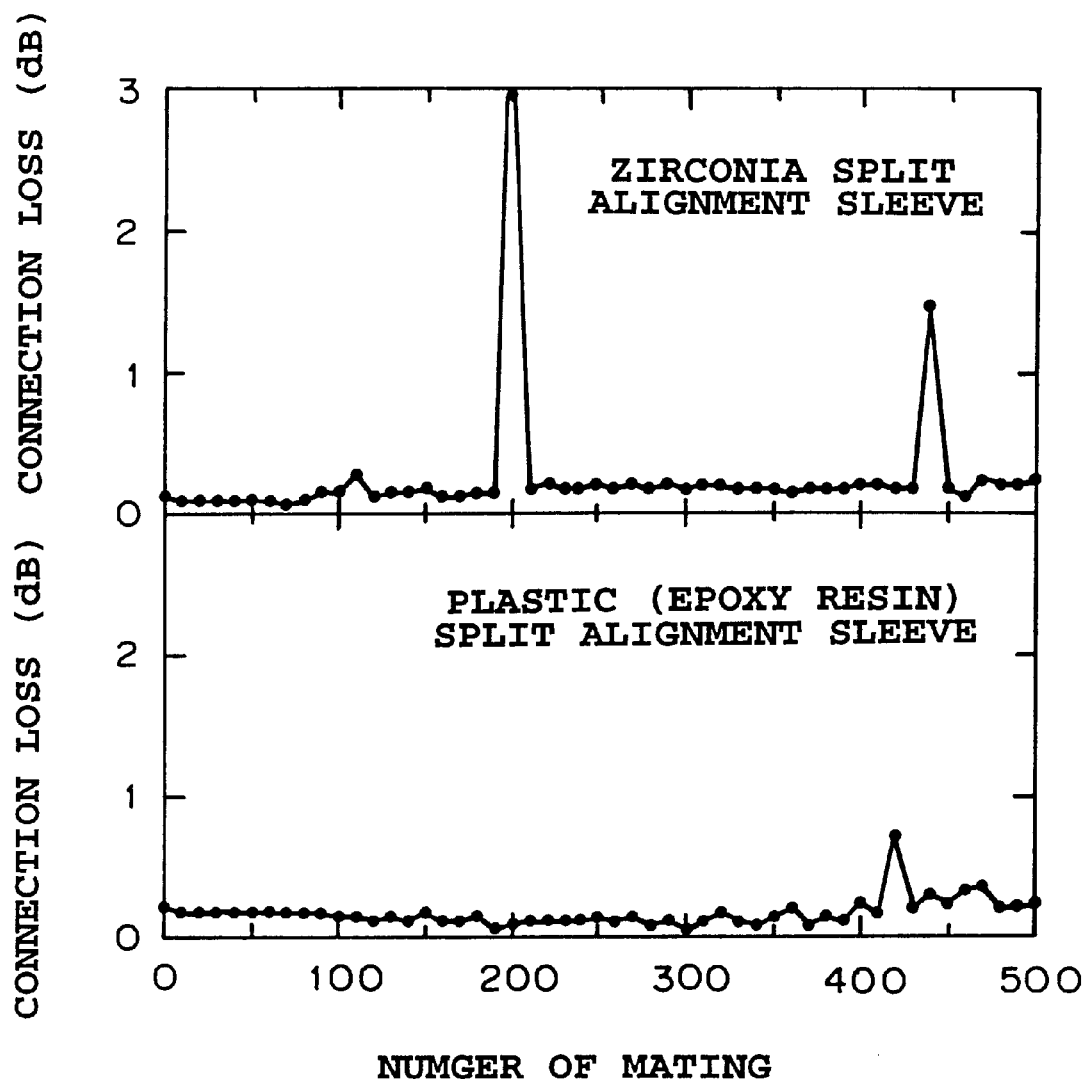
FIG. 22 is a graph showing the results of mating test.

Next, FIG. 22 shows the results of mating test in which a ferrule was attached to and detached from a zirconia split alignment sleeve or a plastic split alignment sleeve 500 times. With the zirconia sleeve, the connection loss sometimes worsened. However, a cleaning procedure returned the connection loss to the original value. Thus, mechanical deterioration may have not occurred. With the plastic sleeve, connection loss did not worsen without cleaning. The zirconia split sleeve and the plastic split sleeve were both free from deterioration of the connecting characteristics after 500 matings, and showed satisfactory mating characteristics.

Example 2

A plastic ferrule was molded using the mold for injection molding illustrated in FIGS. 6A and 6B. The resulting ferrule is shown in FIG. 23.

Figure 23:
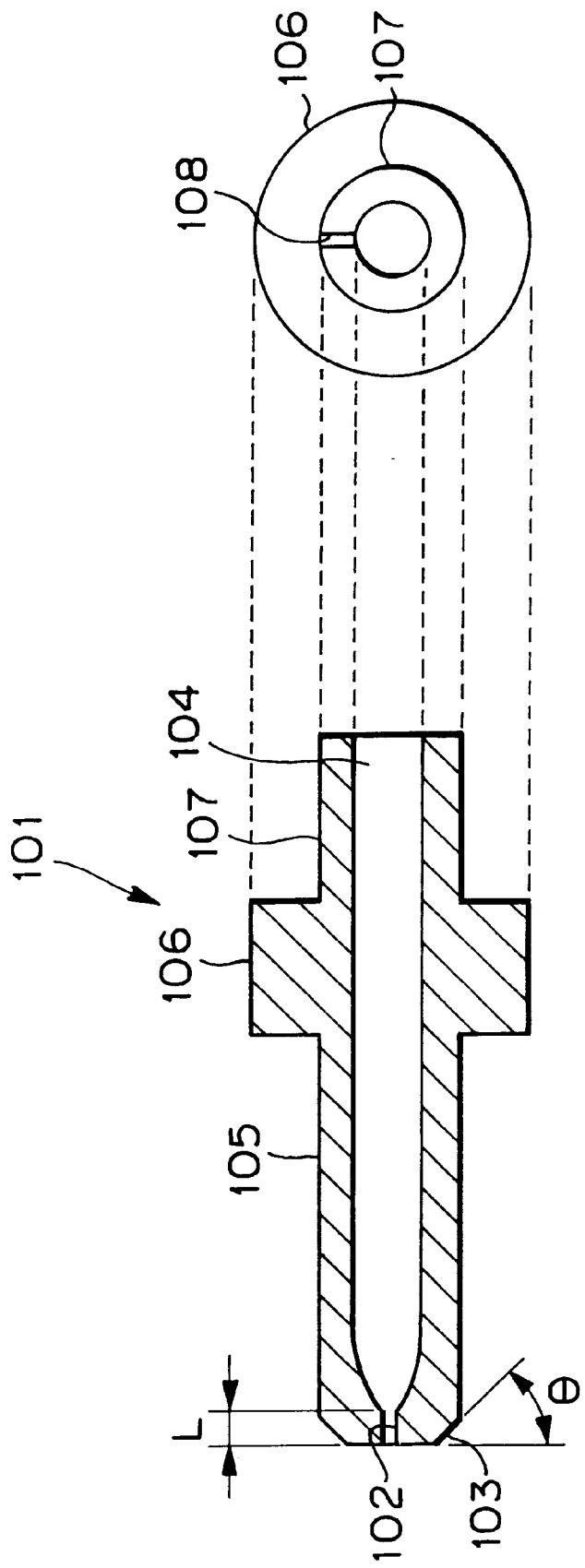
FIG. 23 is a sectional view of a ferrule according to the present invention.

As shown in FIG. 23, the length L of a fiber insertion hole 102 of a ferrule 101 was set at 3.5 mm, and the taper angle of a taper portion 103 of the tip was set at 40 degrees. The ferrule 101 comprised a holding portion 106 for making the ferrule stable held in an optical connector, and an guiding portion 107 for the guide of an optical fiber into the ferrule.

In the instant embodiment, a mark 108 was provided on the end face of the fiber guiding portion of the ferrule 101. An example of the mark 108 is a depression provided on the periphery of the end face of the fiber guiding portion. Various other marks may be used which are easy to see and can be formed by a simple method.

The molding materials used were as follows:
Total aromatic thermotropic liquid

| | |
|---|---|
| Crystal polyester (type II) | 50 parts by weight |
| Silica powder (average particle size 10 μm) | 50 parts by weight |

The linear expansion coefficient in the flowing direction was $0.92 \times 10^{-5}$, the linear expansion coefficient in the perpendicular direction was $4.5 \times 10^{-5}$, and the anisotropy of the resin was 4.9. The linear expansion coefficient was measured in the range of from 30° C. to 150° C. The injection molding conditions are the same as shown in Table 3 of Example 1.

When no eccentricity adjusting mechanism was used, the eccentricity of the fiber hole was an average of 2.8 μm. When the method (A) and/or (B) explained regarding (4) Control of eccentricity was used, the following values were obtained:

Method (A): Average 1.5 μm

Method (B): Average 1.2 μm

Methods (A) and (B) combined: Average 0.6 μm

Method (A) or (B) used alone did not reduce the average eccentricity down to 1 μm or less, and a combination of both methods gave the best results.

The properties of the molded product are shown in Table 4.

TABLE 4

Characteristics of ferrule obtained in Example 2

| Item | Dimensional tolerance |
|---|---|
| Outer diameter [Method (A)] | 2.499 ± 0.0006 mm[b)] |
| Amount of eccentricity of | Average |

TABLE 4-continued

Characteristics of ferrule obtained in Example 2

| Item | Dimensional tolerance |
| --- | --- |
| optical fiber insertion hole [Method (A)] | eccentricity 1.5 μm[a] |
| Size of optical fiber insertion hole | 125 + 1 μm − 0 μm |
| Roundness of outer diameter | 0.9 μm |
| Cylindricity of outer diameter | 1.2 μm[b] |
| Surface roughness | 0.35 μm |

[a]: Yield of ferrule with eccentricity of 1 μm or less: 40%
[b]: Cylindricity was determined excluding the values found in the portions from the tip to the site 1 to 3 mm apart from the tip From Table 4, it is clear that the product fulfilled such dimensional requirements as to be applicable to a single mode fiber. The roundness was 0.9 μm, a higher value than 0.5 μm required of a conventional zirconia ferrule. However, a plastic ferrule can achieve single mode connecting characteristics even when the roundness is 0.5 μm or more, if it is lower than 1 μm. The reasons are as follows: The cause of poor roundness is tiny protuberances of the resin measuring 1 μm or less. Such protuberances may be abraded during optical PC connection, and removed, thus exerting no advance influence on connecting characteristics. The cylindricity is determined except for the portions in the range 1 to 3 mm from the ferrule tip. This is because the wall thickness of the ferrule differs at sites near the tip, thereby producing a concave "necking" in the vicinity of the ferrule tip. However, this necking is located 1 to 3 mm apart from the tip, and it is not simply that a necking appears inside and a convex shape develops outside. Furthermore, the difference in outer diameter between the tip and the junction 3 mm or more apart from the tip is 1 μm or less. This small difference does not exert a marked adverse effect on the connecting characteristics. In determining the cylindricity, therefore, removal of the values in the portions from the tip to the site 1–3 mm apart is substantially effective. Like the roundness, the value of cylindricity was more than 0.5 μm. For the same reasons as stated previously, however, if it is less than 1.5 μm, a substantially unproblematic ferrule is obtained. These facts were uncovered for the first time by the present invention.

Figure 24A:
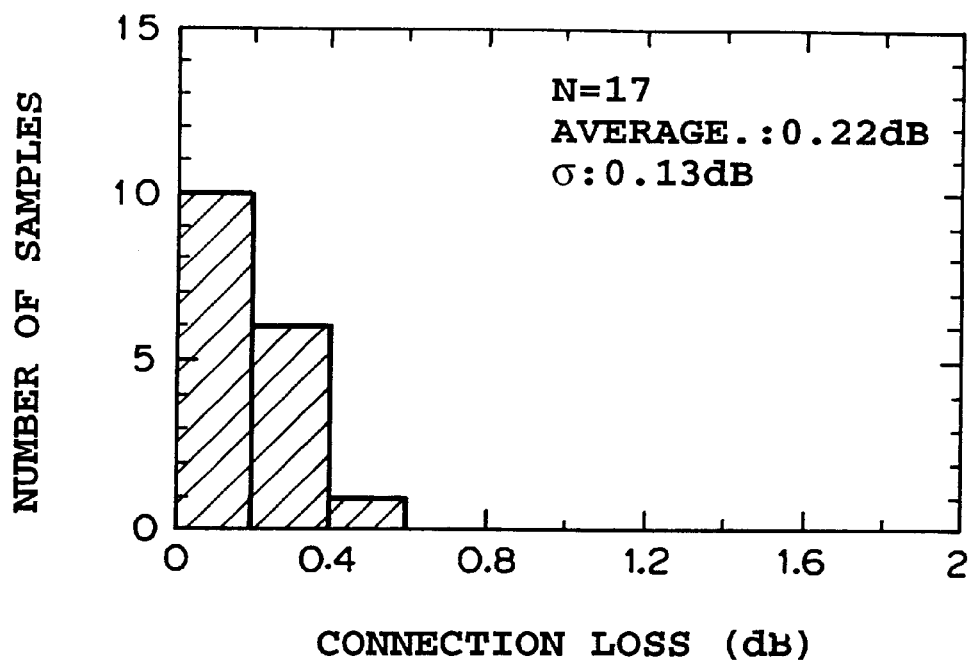
FIGS. 24A and 24B are graph showing the connection loss characteristics.
Figure 24B:
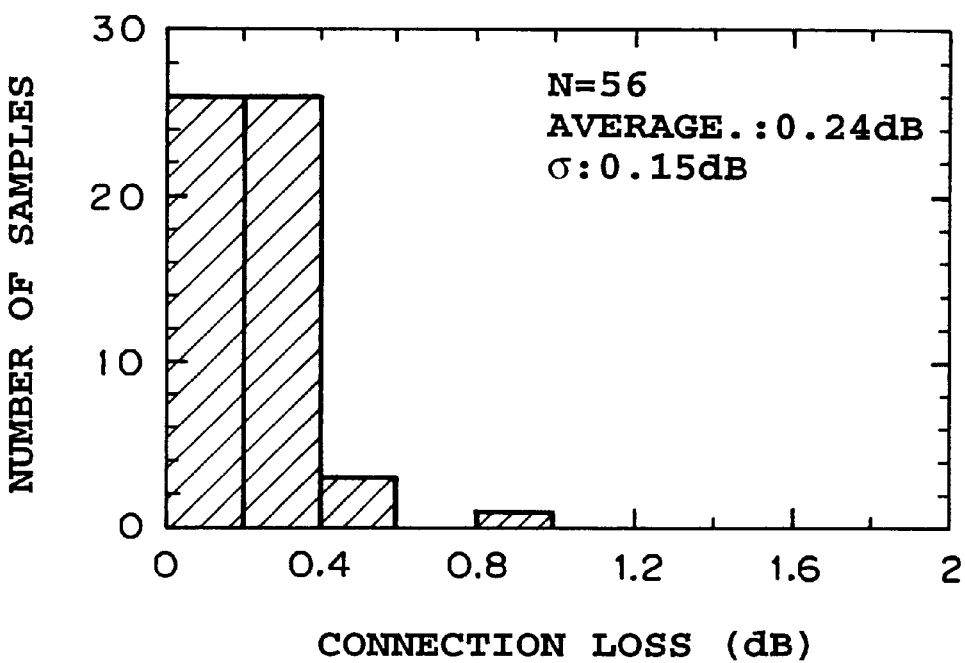
Figure 25:
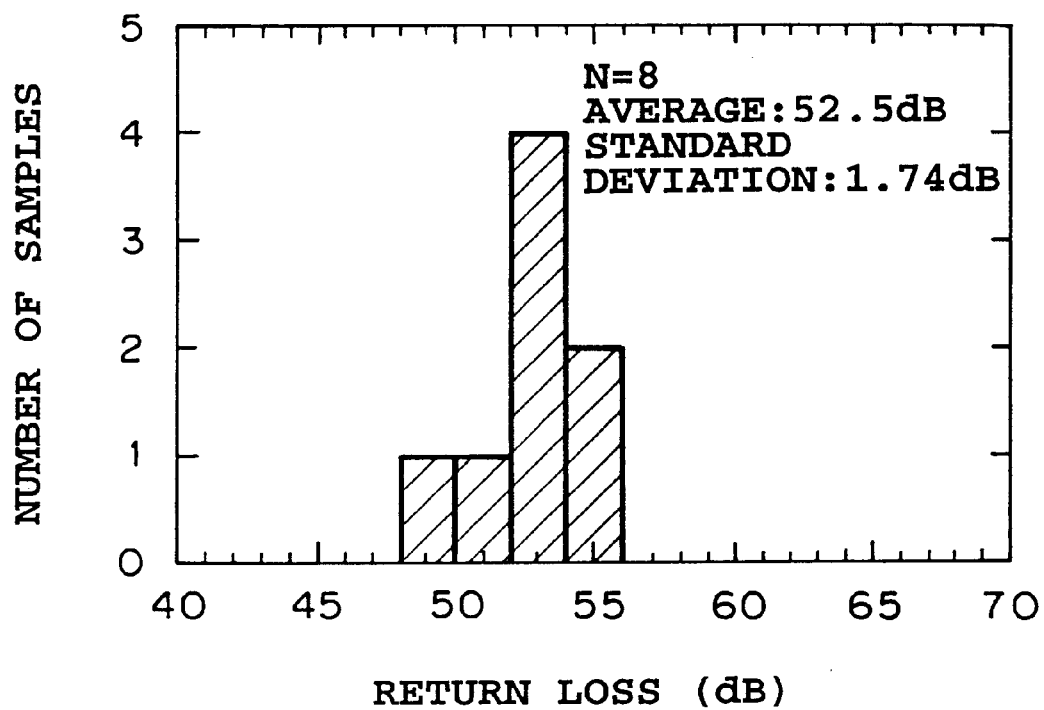
FIG. 25 is a graph showing the return loss characteristics.

An optical connector (SC type) was assembled using the thus produced ferrule, and measured for the connection loss and return loss. The molded ferrule used for the optical connector had eccentricity of 1 μm or less. Grinding was AdPC grinding. Alignment was performed utilizing a mark put on the ferrule. The results of the connection loss characteristics are shown in FIGS. 24A and 24B. FIG. 24A gives the connecting characteristics for connection between a zirconia master connector (eccentricity: 0.3 μm or less) and a plastic ferrule, while FIG. 24B gives the connecting characteristics for connection between plastic ferrules. With the SC connector, the value of 0.5 dB or less is required for connection with the master connector. Thus, the connecting characteristics were sufficient for connection of single mode fibers. FIG. 25 shows the return loss characteristics. An average return loss was 50 dB or more, showing that the ferrule had sufficient characteristics as an AdPC ground ferrule. Table 5 shows the results of various tests for mechanical characteristics and reliability. All the results

TABLE 5

Results of connecting characteristics

| Evaluation item | | Testing conditions | Desired properties | Test results |
| --- | --- | --- | --- | --- |
| O.C. | Connection loss | λ = 1.3 μm | 0.5 dB or less | Average 0.13 dB |
| | Return loss | λ = 1.3 μm | 40 dB or more | Average 50 dB |
| M.C. | Mating test | 500 times | Return loss 40 dB or more | Average 50 ± 2 dB |
| | Vibration test | 10–55 Hz, 2 hr | Ditto | Average 50 ± 2 dB |
| | Surface hitting test | 100 G, 6 ms | Ditto | Average 50 ± 2 dB |
| A.D.C. | Temp. cycling | −25 to 70° C. 100 cycle | Ditto | Average 48 dB |
| | Left at high temp. | 85° C., 960 hr | Ditto | Average 48 dB |
| | Temp. humidity cycling | −10 to 65° C. 93% RH | Ditto | Average 48 dB |

O.C.: Optical characteristics
M.C.: Mechanical characteristics
A.D.C.: Accelerated deterioration characteristics

Examples 3 to 8

Plastic ferrules were prepared in the same manner as in Example 2, except that each of the resin compositions shown in Table 6 was used as the resin composition. The resulting ferrules achieved excellent characteristics as in Example 2.

TABLE 6

Resin composition used in Examples 3 to 8

| Ex. | Liquid crystal polymer | Additive | Linear expansion coefficient[*] Flowing direction | Linear expansion coefficient[*] Perpendicular direction | Anisotropy |
| --- | --- | --- | --- | --- | --- |
| 3 | Type II | Potassium titanate 50% | 0.94 × 10⁻⁵ | 4.6 × 10⁻⁵ | 4.9 |
| 4 | Type II | Zinc oxide 40% | 1.3 × 10⁻⁵ | 5.6 × 10⁻⁵ | 4.3 |
| 5 | Type II | Glass beads 55% | 1.0 × 10⁻⁵ | 3.5 × 10⁻⁵ | 3.5 |
| 6 | Type I | Glass beads 40% | 0.87 × 10⁻⁵ | 3.7 × 10⁻⁵ | 4.2 |
| 7 | Type I | Graphite 60% | 0.95 × 10⁻⁵ | 1.9 × 10⁻⁵ | 2.0 |
| 8 | Type I | Potassium titanate 50% | 0.90 × 10⁻⁵ | 2.9 × 10⁻⁵ | 3.2 |

[*]: Value measured at 30–150° C.

Comparative Example 1

A ferrule was prepared in the same manner as in Example 2, except that a liquid crystal polymer (anisotropy: 9) containing 30% glass fiber was used as the resin composition. Its dimensional accuracy was evaluated, finding that the roundness and cylindricity were 2 μm and 8 μm, respectively, i.e., unsatisfactory characteristics. The amount of eccentricity was not less than 3 μm, even when each of the aforementioned eccentricity adjusting mechanisms was used.

Comparative Example 2

A plastic ferrule was prepared in the same manner as in Example 2, except that a type III liquid crystal polymer was used. The dimensional characteristics achieved were practically the same as in Example 2. However, temperature and humidity cycling test showed that the return loss decreased from 45 dB to 30 dB after 10 cycles.

Comparative Examples 3–12

Plastic ferrules were prepared in the same manner as in Example 2, except that each of the resin compositions shown in Table 7 was used as the resin composition. The problems listed in Table 7 occurred, and the resulting plastic ferrules did not exhibit excellent characteristics.

TABLE 7

Results of Comparative Examples 3 to 12

| Comp Ex. | Liquid crystal polymer | Additive | Aniso-tropy | Problem |
| --- | --- | --- | --- | --- |
| 3 | Type II | Glass beads 40% | 6.2 | Roundness: 1.5 μm Cylindricity: 3.5 μm |
| 4 | Type II | Glass beads 60% | 1.7 | Temp/humid. cycling test: Return loss >0.2 dB |
| 5 | Type II | Potassium titanate 55% | 5.5 | Roundness: 1.3 μm Cylindricity: 3.3 μm |
| 6 | Type II | Zinc oxide 50% | 6.1 | Roundness: 1.4 μm Cylindricity: 3.4 μm |
| 7 | Type I | Glass beads 30% | 5.5 | Roundness: 1.2 μm Cylindricity: 3.3 μm |
| 8 | Type I | Graphite 70% | 1.4 | Temp/humid. cycling test: Return loss >0.2 dB |
| 9 | Type I | Potassium titanate 35% | 5.8 | Roundness: 1.2 μm Cylindricity: 3.3 μm |
| 10 | Type II | Silica powder 70% | 1.8 | Temp/humid. cycling test: Return loss >0.2 dB |
| 11 | Type II | Silica powder 30% | 6.2 | Roundness: 1.2 μm Cylindricity: 3.3 μm |
| 12 | Amorphous LCP*) 50% | Glass beads 50% | 1.3 | Temp/humid. cycling test: Return loss >0.2 dB |

*): Amorphous liquid crystal powder of Du Pont

As described above, the present invention is advantageous in that it provides a plastic ferrule for an optical connector which can be used in connecting single mode fibers and which is excellent in connecting characteristics, reliability and economy. The single mode ferrule now on the marked requires that a flange for holding the ferrule in an adapter be attached to the ferrule after production. The plastic ferrule of the present invention, on the other hand, has a holding portion integrally molded, and thus can omit the step of mounting the flange. Furthermore, the use of a plastic material enables the invention to cut down on the materials cost.

Moreover, the invention is highly versatile and can be applied to various optical connectors.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A plastic ferrule for an optical connector, which has a fiber guide hole at one end and a fiber insertion hole at the other end and whose outer diameter and eccentricity are controlled, comprising:

a first cylindrical body, and a second cylindrical body shorter than said first cylindrical body, said second cylindrical body being formed inside the first cylindrical body with spacing from the first cylindrical body and coaxially with the first cylindrical body;

said first and second cylindrical bodies being continuous so as to close the spacing at their ends on the same side;

the interior of said first cylindrical body defining an guide hole for an optical fiber, and the interior of said second cylindrical body defining a insertion hole for the optical fiber; and a flanged state being formed on the outer periphery of said first cylindrical body.

2. A plastic ferrule for an optical connector as claimed in claim 1, which comprises a thermotropic liquid crystalline total aromatic polyester.

3. A plastic ferrule for an optical connector as claimed in claim 1, wherein said cylindrical portion has a taper at an angle of from 30 to 60 degrees, and the length of said insertion hole is 3 mm or more.

4. A plastic ferrule for an optical connector as claimed in claim 1, wherein holding portion or guiding portion has a mark for showing the relative positional relationship of the ferrule in a mold for injection molding.

5. A plastic ferrule for an optical connector as claimed in claim 2, wherein said cylindrical portion has a taper at an angle of from 30 to 60 degrees, and the length of said insertion hole is 3 mm or more.

6. A plastic ferrule for an optical connector as claimed in claim 2, wherein said holding portion or guiding portion has a mark for showing the relative positional relationship of the ferrule in a mold for injection molding.

7. A plastic ferrule for an optical connector as claimed in claim 3, wherein said holding portion or guiding portion has a mark for showing the relative positional relationship of the ferrule in a mold for injection molding.

8. A method for producing a plastic ferrule for an optical connector, which is bottomed and cylindrical, has one end opened to define an optical fiber guide hole and has the other end forming an opening for serving as an optical fiber insertion hole, comprising:

injection molding a resin composition in molds composed of a movable-side mold and a fixed-side mold, wherein
   a core pin is fixed to said fixed-side mold, said core pin having a thin pin for forming an optical fiber insertion hole;
   a pin catcher is fixed to said movable-side mold, said pin catcher having at the tip thereof a cylindrical depression having a core pin holding hole; and
   the tip of the thin pin is held in the core pin holding hole in a noncontact state during clamping of the molds.

9. A method for producing a plastic ferrule for an optical connector as claimed in claim 8, wherein said resin composition is a resin composition containing at least a thermotropic liquid crystalline total aromatic polyester and an additive for reducing the orientation of the thermotropic liquid crystalline total aromatic polyester.

10. A method for producing a plastic ferrule for an optical connector as claimed in claim 8, wherein a mechanism for controlling the flow of resin is provided in part of a resin flow channel through which the resin composition is injected into the molds.

11. A method for producing a plastic ferrule for an optical connector as claimed in claim 8, wherein the cylindrical center position of the cavity portion of the mold which forms the ferrule cylindrical portion and which does not move in accordance with the clamping of the molds is movable relative to the central position of the thin pin forming the optical fiber insertion hole.

12. A method for producing a plastic ferrule for an optical connector as claimed in claim 9, wherein a mechanism for controlling the flow of resin is provided in part of the resin flow channel of the mold.

13. A method for producing a plastic ferrule for an optical connector as claimed in claim 9, wherein the cylindrical center position of the cavity portion of the mold which forms the ferrule cylindrical portion and which does not move in accordance with the clamping of the molds is movable relative to the central position of the thin pin forming the optical fiber insertion hole.

14. A plastic ferrule for an optical connector, whose outer diameter changes and eccentricity have been controlled, said ferrule comprising a resin composition which contains at least a thermotropic liquid crystalline total aromatic polyester and an additive for reducing the orientation of the thermotropic liquid crystalline total aromatic polyester, and which, when injection molded, has anisotropy of the resin of 2 to 5 expressed as the ratio between the values of physical properties measured in the flowing direction of the resin and the direction perpendicular to the flowing direction.

15. A plastic ferrule for an optical connector as claimed in claim 14, wherein said thermotropic liquid crystalline total aromatic polyester comprises a polymer of the formula (1) or (2):

16. A plastic ferrule for an optical connector as claimed in claim 14, wherein said holding portion or guiding portion has a mark for showing the relative positional relationship of the ferrule in a mold for injection molding.

17. A plastic ferrule for an optical connector as claimed in claim 15, wherein said holding portion or guiding portion has a mark for showing the relative positional relationship of the ferrule in a mold for injection molding.

18. A method for producing a plastic ferrule for an optical connector, which comprises a cylindrical portion having one insertion hole for fixing an optical fiber and directly related to connection, a holding portion for allowing the cylindrical portion to be stably held in an optical connector, and an guiding portion for allowing an optical fiber to be guided into the ferrule, comprising:

injection molding a resin composition in a mold;

said resin composition containing at least a thermotropic liquid crystalline total aromatic polyester and an additive for reducing the orientation of the thermotropic liquid crystalline total aromatic polyester; and said mold having a thin pin for forming an optical fiber insertion hole, said thin pin being provided inwardly of the tip of the cavity portion which forms the ferrule cylindrical portion and which does not move in accordance with mold clamping; said mold also having a pin receiving member having a pin receiving hole for receiving the tip of the thin pin during mold clamping, said pin receiving member being provided in the cavity portion moving in accordance with mold clamping; and the tip of the pin receiving member having an outer wall extending toward the cavity tip beyond the inside pin receiving hole to take a tubular form so as to surround from the surroundings the thin pin to be inserted in the pin receiving hole during mold clamping.

19. A method for producing a plastic ferrule for an optical connector as claimed in claim 18, wherein the cylindrical center position of the cavity of the mold is movable relative to the central position of the thin pin forming the optical fiber insertion hole.

20. A method for producing a plastic ferrule for an optical connector as claimed in claim 18, wherein a mechanism for controlling the flow of resin is provided in part of a resin flow channel through which the resin composition is injected into the molds.

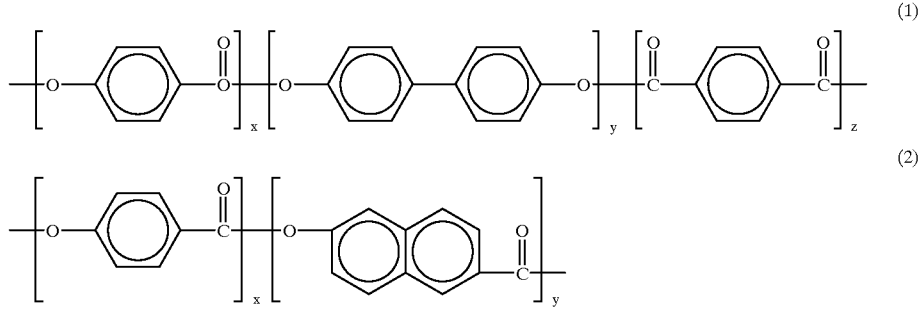

21. A method for producing a plastic ferrule for an optical connector as claimed in claim 19, wherein a mechanism for controlling the flow of resin is provided in part of a resin flow channel through which the resin composition is injected into the molds.

* * * * *